(12) United States Patent
Baets et al.

(10) Patent No.: US 7,251,398 B2
(45) Date of Patent: Jul. 31, 2007

(54) METHOD FOR PROVIDING AN OPTICAL INTERFACE AND DEVICES ACCORDING TO SUCH METHODS

(75) Inventors: Roeland Baets, Deinze (BE); Ronny Bockstaele, Merelbeke (BE); Kris Naessens, Melle (BE); Olivier Rits, Ghent (BE)

(73) Assignee: Interuniversitair Microelektronica Centrum (IMEC), Leuven (BE)

( * ) Notice: Subject to any disclaimer, the term of this patent is extended or adjusted under 35 U.S.C. 154(b) by 74 days.

(21) Appl. No.: 11/182,046

(22) Filed: Jul. 14, 2005

(65) Prior Publication Data

US 2006/0045421 A1    Mar. 2, 2006

Related U.S. Application Data

(60) Provisional application No. 60/605,241, filed on Aug. 26, 2004.

(30) Foreign Application Priority Data

Feb. 14, 2005   (EP) .................. 05447027

(51) Int. Cl.
*G02B 6/26* (2006.01)
*G02B 6/42* (2006.01)

(52) U.S. Cl. .......................... 385/52; 385/15

(58) Field of Classification Search .......... 385/15, 385/52
See application file for complete search history.

(56) References Cited

U.S. PATENT DOCUMENTS 5,590,232 A    12/1996   Wentworth et al. .......... 385/92

(Continued)

FOREIGN PATENT DOCUMENTS

DE    4022076 A1    1/1992

(Continued)

OTHER PUBLICATIONS

Partial European Search Report FOR EP 05 44 7027 dated Jul. 5, 2005.

(Continued)

*Primary Examiner*—Frank G. Font
*Assistant Examiner*—Jerry Martin Blevins
(74) *Attorney, Agent, or Firm*—McDonnell Boehnen Hulbert & Berghoff LLP

(57) ABSTRACT

A method for providing an optical interface with at least one optical coupling structure for a packaged optical device is described. The at least one optical coupling structure may be, for example, wave-guides and/or microlenses. The packaged optical device includes an external alignment structure. The external alignment structure has a support means with at least one hole and at least one alignment feature. The method includes providing optical encapsulate material in the hole of the support means. Optical coupling structures, such as wave-guides or microlenses, may be provided into the encapsulation at a well-defined position relative to the at least one alignment feature of the external alignment structure. By providing the optical coupling structures directly in the material comprised in the encapsulation, a high degree of alignment accuracy is obtained.

19 Claims, 24 Drawing Sheets

U.S. PATENT DOCUMENTS

| | | | |
|---|---|---|---|
| 6,015,239 A | 1/2000 | Moore | 385/92 |
| 2001/0021287 A1 | 9/2001 | Jewell et al. | 385/14 |
| 2002/0021874 A1 | 2/2002 | Giboney et al. | 385/90 |
| 2004/0184702 A1* | 9/2004 | Hayamizu et al. | 385/14 |
| 2006/0072225 A1* | 4/2006 | Schilling et al. | 359/883 |

FOREIGN PATENT DOCUMENTS

| | | | | |
|---|---|---|---|---|
| EP | 982 610 A2 | | 3/2000 | |
| WO | WO 00/31771 | * | 6/2000 | 250/239 |
| WO | WO 02/093696 A2 | | 11/2002 | |

OTHER PUBLICATIONS

Kagami, Manabu et al., "Light-Induced Self-Written Three-Dimensional Optical Waveguide", Aug. 20, 2001, vol. 79, No. 8.

Naessens, Kris et al., "Direct Writing of Microlenses in Polycarbonate with Excimer Laser Ablation", Nov. 1, 2003, vol. 42, No. 31. (XP-002334251).

Beinhorn et al., "Micro-Lens Arrays Generated by UV Laser Irradiation of Doped PMMA", May 5, 1999, Appl. Phys. A. 68. p. 709-713 (1999). (XP-002334252).

* cited by examiner

METHOD FOR PROVIDING AN OPTICAL INTERFACE AND DEVICES ACCORDING TO SUCH METHODS

RELATED APPLICATIONS

The present patent application claims priority under 35 U.S.C. § 119(e) to U.S. Provisional Patent Application Ser. No. 60/605,241, which was filed Aug. 26, 2004. The present patent application also claims priority under 35 U.S.C. § 119(b) to European Patent Application No. EP 05447027.3, which was filed on Feb. 14, 2005. The full disclosures of U.S. Provisional Patent Application Ser. No. 60/605,241 and European Patent Application No. EP 05447027.3 are incorporated herein by reference.

FIELD

The present invention relates generally to optoelectronics and optical interconnects for optoelectronics. More specifically, the present invention relates to method and apparatus for packaging optoelectronic modules.

BACKGROUND

An optoelectronic module typically comprises one or more optoelectronic components, such as light emitting diodes (LEDs), lasers, detectors, optical modulators, and one or more electronic chips, such as CMOS, BiCMOS, GaAs, or any other technology to used to fabricate integrated circuits. At least one of these electronic chips is connected electronically to at least one of the optoelectronic components. The connection may be made using wire bonding, flip-chipping, or any other suitable technique for achieving electrical connection.

Typically, in addition to an electrical connection, an optical interface is provided on the optoelectronic module, which provides an interface from the optoelectronic module to an external optical system. The external optical system can be a connector with optical fibers, an optical sensing system, or light emitting system.

The optoelectronic modules need to be packaged. A package for the optoelectronic modules needs to provide an optical interface for connecting to an external optical system, so that an optical signal to be obtained or received can be coupled out. The optical interface fulfills two functions. First, the optical interface facilitates a precision alignment from the optoelectronic module to the external optical system, with accuracy typically in the order of 1 to 10 µm depending on the application. For example, for multi-mode systems the accuracy is typically of the order of 10 µm and for single-mode systems the accuracy is typically in the order of 1 µm. Such accuracy is typically required, for example, in parallel optical interconnect systems.

The precision alignment may be achieved by using external alignment feature structures, such as alignment pins or ferrule accepting reference holes. The use of alignment pins is described in U.S. Patent Application Serial No. 2003/0219217. The use of ferrule accepting reference holes is described in U.S. Patent Application Serial No. 2003/0136968.

A second function of the optical interface is to facilitate guiding of light to and from the external optical system. Optical elements, such as lenses or wave-guides, integrated into the external alignment structure may be used to facilitate the guiding of light.

The optical packaging is employed to assemble the optical elements and the external alignment feature structure on the optoelectronic package with the desired accuracy. For example, micro lens arrays can be positioned in the package, as described in U.S. Pat. No. 6,736,553. As another example, wave-guides can be positioned in the package, as described in U.S. Pat. No. 6,674,948 and U.S. Pat. No. 6,722,788. Typically, the assembly of the package uses alignment features on the optoelectronic module, the optical element, and the external alignment feature structure.

When packaging, it is desirable that the optical element includes alignment features to assure a good positioning of the optical element on the optoelectronic package. This is not a simple task as the fabrication of the optical elements and the fabrication of alignment features on these optical elements typically use different technologies. Whereas the alignment features typically are made using thin-film techniques, the optical components typically are made using other techniques such as etching or molding. The use of these different techniques for fabricating the alignment features and the optical components usually results in some amount of misalignment.

In the assembly phase, the optical element is positioned on the optoelectronic module, again resulting in some misalignment, as well as longer fabrication times and a decreased yield. It is to be noted that in the optoelectronic module, not only the X and Y position, but also the vertical distance, i.e., the Z-alignment, between two objects determines the coupling efficiency. To achieve good Z-alignment, precision mechanical elements, such as spacers, are employed to define the height position of two objects. Using precision mechanical elements is expensive, involves additional handling, and is dependent on the availability of high-precision mechanical parts with the desired accuracy.

In LED packages and similar products, lenses are molded directly in the package, omitting the need for an intermediate optical element. In the same molding step, the alignment features to the external optical system can be defined (for example, to accept the ferrule of the connector). However, such directly molded optical structures on the optoelectronic module, in general, cannot produce accuracy better than 10 nm. Furthermore, this technique is limited to lenses only, and is not suitable for making alignment pins.

The molding process employs high-pressure and temperature to achieve good optical quality of the molded structure, which may not be compatible with the underlying optoelectronic module. Moreover, non-recoverable expenses of the molding process are relatively high, as designing the mold is an iterative and expensive process. Finally, this technique is not flexible, as it does not allow integrating the external alignment features into the package during molding. Furthermore, each design employs a new mold.

Most techniques used for fabricating refractive microoptical components are based on well-known processes coming from microelectronics, such as standard lithographic techniques combined with a thermal reflow process and, if desired, pattern transfer to a substrate using dry etching or lithography using half-tone (e.g., greyscale), masks, and etching. Other direct-write techniques include laser writing (e.g., with a focused HeCd laser), e-beam or focused ion-beam writing, diamond turning, and micro-jet printing to name a few.

Replication of these structures in large quantities typically is achieved by injection molding, embossing, or casting. Another technique more recently introduced as a feasible fabrication technology, is laser ablation. This technique differs significantly from 'laser writing' mentioned above. In the first place, laser ablation does not require resist development as the material is physically removed during ablation. Secondly, while laser writing with a HeCd laser is limited to resists of merely a few microns thick, laser ablation allows machining of surfaces up to several hundreds of microns deep. Finally, it should be noted that pulsed laser ablation, in particular when an excimer or $CO_2$ laser source is employed, involves a beam size that is much larger than the focused submicron spot of a continuous laser writing device, and typically amounts to several tens of microns or larger.

Laser ablation offers some advantages with respect to the previously mentioned fabrication techniques as laser ablation has a direct-write and contactless etching nature. Additionally, laser ablation has the potential to define microstructures and microoptics on a top surface of a heterogeneous optoelectronic module in a very late phase of the assembly process. Several techniques using laser ablation, in particular excimer laser ablation, for microoptics fabrication have been reported. In general, these techniques suffer from a variety of disadvantages, making laser ablation less attractive as prototyping technology.

In Appl. Opt. 36 (1997) p. 4660, Wang et al. suggest using complex mask patterns for fresnel lens fabrication. This method is not cost-effective when lenses with different focal lengths, diameters, or shapes need to be fabricated since every other lens requires different mask patterns. The application of greyscale masks, as suggested by Matz et al. in Appl. Phys. A 65 (1997) p. 349, suffers from the same disadvantage. Mihailov and Lazare in Appl. Opt. 32 (1993) p. 6211 report on the ablation of islands in a polymer substrate, followed by thermal reflow. Although the ablation process can be performed within seconds, reflow of the surface typically takes a few hours, making the technique less suitable for fast prototyping.

Another approach is based on irradiation of the polymer with UV (i.e., wherein no actual ablation is involved) and swelling of the irradiated zone due to diffusion of Styrene in a controlled way. Again, this last process step requires several hours to finish the microlenses. A similar process is based on irradiation of doped PMMA at subablative fluence only, as described by Beinhorn et al. in Appl. Phys. A 68 (1999) p. 709, where spontaneous swelling is the result of a balanced combination of photochemical reactions and surface tension, which means that the process is likely to be very material, dopant, and fluence sensitive.

Other work involves the use of scanning excimer laser ablation for correction of phase aberrations of glass lenses by ablation of a thin resin coating on the lens. However, experimental results report only on maximum ablation depths up to 5 µm. Examples with $CO_2$ laser heating are also reported. None of the above-mentioned techniques combines fast processing with a sufficient machining accuracy and compatibility with heterogeneous assembly processing.

The use of connectors as external optical systems, for example in parallel optical interconnect systems, employs a flat optical interface to allow for a good physical contact between the connector and the optoelectronic module. Standard molding techniques cannot achieve the desired level of flatness, which can be, for instance, 0.1, 0.2, 0.5, 1, or 2 µm. Precision molding of micro lenses is shown in U.S. Pat. No. 6,597,020. These techniques allow for the production of optical elements and are suitable for producing the optical elements that could be assembled onto the optoelectronic module in a later step.

In U.S. Pat. No. 6,722,788, the problem of coupling light from/to an optoelectronic device in a package is described. The capability of out/in coupling of light is provided for using a complex system of connectors and couplers, which carry optical fibers and couple the fiber through the package towards the optoelectronic component, so that the fibers are well aligned with respect to the underlying optoelectronic component. A series of fibers is bundled in a fiber bundle array connector. A coupler holder piece, into which a light collimating or imaging coupler can fit, is fixed to a module connector. The module connector is the latching piece that usually sits permanently on the module, and onto which a fiber bundle array connector can fit. A fiber bundle array connector is then inserted into the module connector piece/coupler holder combination.

Light is shone through the far end of the fiber bundle so that light emits from the fiber array connector end. This light can be used for alignment purposes. The collimated coupler is inserted into the coupler holder and aligned so that the critical optical elements of the collimated coupler are aligned to the individual fibers in the fiber bundle/bundle array connector. Once the two pieces are aligned, the collimated coupler is permanently fixed in place in the coupler holder. This assures that any time the fiber bundle array is removed from and reconnected to the module connector that the individual fibers will still be aligned relative to the collimated coupler.

The assembly containing the collimated coupler, the coupler holder, and the module connector is then aligned relative to the chip assembly so that all of the optical elements in the collimated coupler are aligned relative to all of the optical devices in the chip assembly. This assures that efficient transfer of light between the optical devices and the collimated coupler occurs. The assembly containing the collimated coupler, the coupler holder, and the module connector is then brought into close proximity to the chip assembly and permanently affixed in place. This seals the optical devices, ensures that the alignment between the optical devices and the collimated coupler is maintained, and ensures that the spacing between the optical devices and the collimated coupler is small enough so that cross talk does not take place. This technique is very complex, expensive, and has reliability problems.

Therefore, there is a need for a technique of packaging optoelectronic modules using simple manufacturing techniques, and that results in better accuracy and process compatibility with the underlying optoelectronic module.

SUMMARY

A method for providing an optical interface to a packaged optical or optoelectronic module, and devices comprising such an optical interface are described. A method for producing a micro lens in a polymer material, which is part of an optical module, and to provide devices thus produced is also described. The method for providing an optical interface to a packaged optical or optoelectronic module results in an optical interface having high alignment accuracy.

The method for providing an optical interface with optical coupling structure includes providing an external alignment structure comprising a support means with at least one hole and at least one alignment feature; providing an encapsulation comprising at least an optical encapsulate material into the at least one hole; and forming at least one optical coupling structure in the encapsulation at a well-defined position relative to the at least one alignment feature of the external alignment structure.

Forming the at least one optical coupling structure in the encapsulation may include direct writing the optical coupling structure to the encapsulation. Forming the at least one optical coupling structure in the encapsulation may also include producing optical coupling structures in the optical encapsulate material. An optical coupling structure may be, for example, a lens, a flat surface, or a mirror.

The method may also include, prior to producing the at least one optical coupling structure in the encapsulation, flattening an external surface of the optical encapsulate material, creating an optically substantially flat external surface of the encapsulation. The optically flat external surface may be created at a well-defined position relative to the support means, such as a support plate.

The external surface of the encapsulation may be aligned with an external surface of the support means. The external surface of the optical encapsulate material may be positioned in the same plane as the external surface of the support means. Alternatively, the external surface of the encapsulation may be outside a plane determined by the external surface of the support means.

The optical coupling structure may include micro lenses, formed on an external surface of the encapsulation. The external surface of the encapsulation may be an external surface of the optical encapsulate material.

Flattening the external surface of the optical encapsulate material may include providing a flattening layer on the external surface of the optical encapsulate material, and curing of the optical encapsulate material underneath the flattening layer. The flattening layer, such as a polymer layer, may be part of the encapsulation. The optical coupling structure may be provided in the flattening layer. The flattening layer may be replaced by an alternative layer, such as a second polymer layer, to be part of the encapsulate. The optical coupling structure may be provided in the alternative layer.

Alternatively, flattening the external surface of the optical encapsulate material may include providing a flattening layer on a stamp, pressing the flattening layer on the external surface of the optical encapsulate material by means of the stamp, curing the optical encapsulate material underneath the flattening layer, and removing the stamp. The step of removing the stamp may also remove the flattening layer. Alternatively, the step of removing the stamp may leave the flattening layer attached to the cured optical encapsulate material, as part of the encapsulation.

The curing step may comprise different sub-steps. The flattening may comprise at least one radiation (e.g., UV) curing step. A mask may be used to pattern the at least one radiation (e.g., UV) curing step. The stamp may be such that it forms the mask.

The optical coupling structures may be wave-guides formed through the encapsulation. The wave-guides may be formed through the optical encapsulate material. The wave-guides may be formed through the flattening layer (e.g., a polymer layer). The wave-guides may be formed through the alternative layer (e.g., a second polymer layer). The wave-guides may be ordered into an array configuration.

The hole may include an optical element. The support means may include alignment features on both sides of the hole.

The method may further include, prior to providing an external alignment structure, positioning an external alignment feature on a support means of a device having at least one optoelectronic component. Providing an encapsulation bridges a gap between the optical interface and the at least one optoelectronic component on the device. The optical coupling structures abut onto the at least one optoelectronic component.

Producing at least one optical coupling structure may include ablating at least one optical coupling structure into the encapsulation. The optical coupling structure may be ablated into the optical encapsulate material, the flattening layer, and/or the alternative layer.

An optical module is also disclosed. The optical module includes a cavity and an external alignment structure based on a support means. The external alignment structure includes at least one hole providing an entrance to a cavity and at least one alignment feature extending outwards from a surface of the support means. The optical module further includes an encapsulation comprising at least optical encapsulate material inside the cavity. The encapsulation extends into the at least one hole. The encapsulation includes at least one optical coupling structure aligned with the at least one external alignment feature. The at least one optical coupling structure may be a flat external surface or at least one micro lens directly written in an external surface of the encapsulation.

The optical module furthermore may comprise at least one optoelectronic component provided in the cavity; an interposer providing an interface between the at least one optoelectronic component and a printed circuit board; a surrounding support structure, which is surrounding the at least one optoelectronic component; and a cured adhesive in between the external alignment structure and the surrounding support structure. The interposer, the surrounding support structure, the cured adhesive, and the external alignment structure form the cavity. The cavity can be closed except for the at least one hole. The optical encapsulate material extends onto the at least one optoelectronic component.

The optical encapsulate material may be a curable polymer. The at least one optical coupling structure in the encapsulation may comprise optical wave-guides. The optical wave-guides may be positioned perpendicularly on the surface of the interposer. The optical wave-guides may be self written wave-guides. The optical wave-guides may be holes in the encapsulation filled with a filing material, such as polymer material, different from the optical encapsulate material.

The at least one optical coupling structure in the encapsulation may comprise at least one micro lens fabricated by means of laser ablation. The optical wave-guides may be coupled to optical ports of an optical component.

A method for producing at least one optical coupling structure in a material suitable for laser ablation at a controlled location is described. The method includes providing a layer of material suitable for laser ablation and laser ablating the material suitable for laser ablation so that at least one optical coupling structure is formed. The method may also include curing the material suitable for laser ablation.

The at least one optical coupling structure may be a micro lens, flat surface, or mirror. The at least one optical coupling structure may be buried. The at least one optical coupling structure may be ablated on top of active components of a package of an optical module. The latter avoids the need for aligning afterwards. The ablated optical coupling structure may be buried at a predetermined depth in the encapsulant. The predetermined depth may be optimized in an active manner or based on the measured coordinates with the alignment technique.

The material suitable for laser ablation is part of a package of an optical module. The material suitable for laser ablation may be a polymer material, a glass or glass-like material, quartz, metals, or a ceramic. Polymer material is especially suited for laser ablation. The material suitable for laser ablation may be part of an optical encapsulate material or a polymer layer of the package of an optical module. The material suitable for laser ablation may provide mechanical and/or thermal protection of underlying components.

The method may include, prior to laser ablating the material suitable for laser ablation, flattening the surface of the polymer material. The method may also include reflowing a surface of the at least one optical coupling structure. The reflowing a surface of the at least one optical coupling structure may be performed by applying an extra laser ablation pulse.

The at least one optical coupling structure may be a plurality of micro lenses, arranged in an array configuration. The use of an array of microlenses includes display systems such as LED or OLED displays with a microlens or microlenses above each pixel element of the display.

A method for controlled positioning and bonding of an external alignment structure on a module is also described. The module includes a supporting means with a supporting surface area and module alignment reference features. The external alignment structure includes external alignment structure reference features. The method includes providing an adhesive on the module or on the external alignment structure; measuring the position of the alignment reference features of the module and the position of the external alignment reference features; deriving the relative position between the module and the external alignment structure; bringing the external alignment structure and the module towards each other into a required relative position; and curing the adhesive.

Providing an adhesive on the module or on the external alignment structure may include providing an adhesive on at least part of the supporting surface area or on at least part of the external alignment structure reference features. The method may also include providing an encapsulant on top of opto-electronic components of the module. The encapsulant may be a transparent encapsulant.

The method may also include, prior to the bringing the device and module towards each other into a required relative position (x, y, z), providing a required relative position (x, y, z). The method may also include, deriving a difference between the relative position between the module and the device and the required relative position.

The module may comprise an optical component. The supporting means includes an optical interface with optical coupling structures. The required relative position may be such that the optical coupling structures are aligned with the optical component.

A method is described for providing an optical interface with optical coupling structures having a high degree of compatibility with the optoelectronic module. Methods are provided for creating an optical interface immediately incorporated in the packaging of the optoelectronic module. No separately fabricated optical coupling structures need to be made.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein:

FIG. 3b illustrates a confocal microscopy image of the surface of a structure according to FIG. 3a;

FIG. 11a to FIG. 11c respectively illustrate a lens profile with a radius of curvature R=125 μm (a), a photograph of the lens surface (b), and a SEM photograph of a lens, for an ablated lens, according to an example;

FIG. 12a shows a typical phase distribution of a wave front measured above the lens for a spherical wave front entering an ablated lens from the substrate side, according to an example;

FIG. 12b shows the non-circular symmetric aberrations due to backlash of the translation stage for a measurement as shown in FIG. 12a.

DETAILED DESCRIPTION

Figure 1:
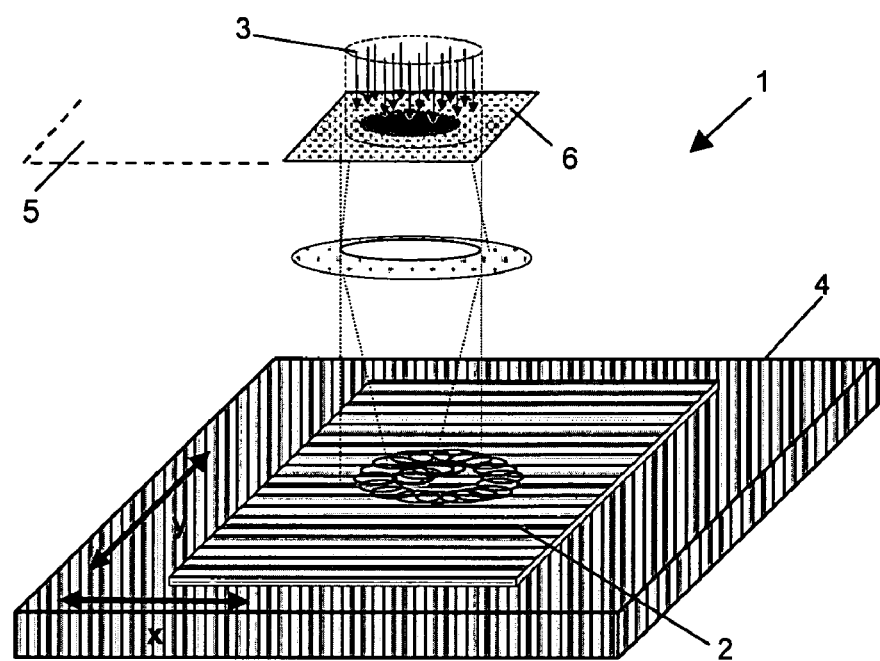
FIG. 1 is a schematic representation of a scanning contour ablation system, according to an example.

The present invention is described with respect to particular examples and with reference to certain drawings, but the invention is not limited thereto but only by the claims. The drawings described are only schematic and are non-limiting. They are intended to illustrate some aspects and examples of the present invention. Not all alternatives and options are shown. In the drawings, the size of some of the elements may be exaggerated and not drawn on scale for illustrative purposes. The dimensions and the relative dimensions may not correspond to actual reductions to practice of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the examples of the invention described herein are capable of operation in other sequences than described or illustrated herein.

Moreover, the terms top, bottom, over, under, and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising," used in the claims, should not be interpreted as being restricted to the means listed thereafter; it does not exclude other elements or steps. The term "comprising" is, thus, to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B.

Similarly, it is to be noticed that the term "coupled," should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The invention will now be described by a detailed description of several examples of the invention. It is clear that other examples of the invention can be configured according to the knowledge of persons skilled in the art without departing from the true spirit or technical teaching of the invention, the invention being limited only by the terms of the appended claims.

In some examples of the present invention, laser ablation (e.g., scanning contour laser ablation) can be used to create optical elements, such as microlenses or specific surfaces in a layer, such as mirrors. Laser ablation is described in more detail as follows. Hereinafter, a theoretical description of the microstructure formation due to scanning contour laser ablation and how a desired structure for an optical element can be realized by calculation of an optimum contour set, as well as, a fabrication process for optical elements, such as several spherical microlenses (e.g., in polycarbonate), including experimental results of the obtained ablated microlenses are discussed. The laser ablation technique for creating the optical elements and the properties of the obtained optical elements is described by way of example for microlenses, although the invention is not limited thereto. The laser ablation technique can also be used for creating specific surfaces, such as mirrors.

The proposed laser ablation technique is based on ablating several concentric circular trenches with scanning ablation. A typical set-up 1 is shown in FIG. 1. Each trench is realized by moving a sample 2 along a circular path while a excimer laser is firing laser beam 3 pulses at a constant pulse frequency and fluence. The laser beam 3 has a typical size of 20-500 μm and scans the surface of the sample 2 (e.g., a polymer surface) along several contours or trenches. Whenever a trench is finished the laser stops and a stage 4 moves to a new starting position for ablating a next trench. During the contouring of the stage 4, all positions on the sample 2 make a circular movement with the same diameter but with a different center. The laser beam 3 remains on a fixed position during the process. In aperture plane 5, the cross-section of the laser beam 3 is determined using a mask 6 with a shaped aperture. For example, the aperture may be circular.

For a given diameter of the laser beam 3, each ablated trench is determined by its depth, which is proportional to the number of overlapping pulses, and by its contour diameter, which fixes the exact profile of the trench as explained below. In order to derive an analytic expression for the trench depth, it is assumed that the laser is operating in continuous working (CW) mode. It is assumed that the laser fluence is homogeneous over the entire beam area and, consequently, the ablated crater has a uniform depth, proportional to the exposure time. This means that the presence of depth variations close to the edge of the crater due to diffraction effects, typically laterally limited to a few μm from the edges, is neglected. Given the diameter $\phi_{beam}$ of the beam and the diameter of the contour D, the contour velocity of the stage v, and the ablation depth per unit of time k, the profile of a single trench can be written as:

$$y(r) = ap(r) \quad [1]$$

in which:

$$a = \frac{\pi D k}{v} \text{ and}$$

$$p(r) = \begin{cases} \frac{1}{\pi} a \cos\left(\frac{D^2 + 4r^2 - \phi_{beam}^2}{4rD}\right) & \text{if } \frac{D - \phi_{beam}}{2} < r < \frac{D + \phi_{beam}}{2} \\ 1 & \text{if } \frac{\phi_{beam} - D}{2} < r \\ 0 & \text{if } r < \frac{D - \phi_{beam}}{2}, r > \frac{D + \phi_{beam}}{2} \end{cases}$$

Figure 2A:
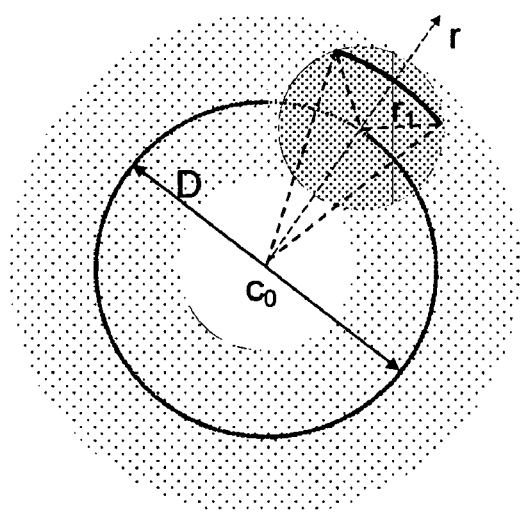
FIG. 2a is a schematic illustration of parameters used for calculating trench profile ablated with scanning contour ablation, according to an example.

In these expressions, r is the radial co-ordinate with the origin being the center $c_0$ of the trench, as indicated in FIG. 2a, and p can be interpreted as a probability of a location with co-ordinate r to be exposed to the laser beam during one contour movement of the sample stage. In the area that is scanned by the beam during one contour, the material has either been ablated continuously—these locations are always within the beam during the full contour scan—or only during a limited amount of time. In the first case, the probability factor is 1.0 and in the second case a value is assigned that is proportional to the time required for the beam to pass over the location. This probability can be calculated by determining the arc length of a circle with radius r within the beam area, as illustrated in FIG. 2a for a value $r_1$. The factor a represents the full ablation depth for locations with p=1.0 and is proportional to the full contour scan time.

Figure 2B:
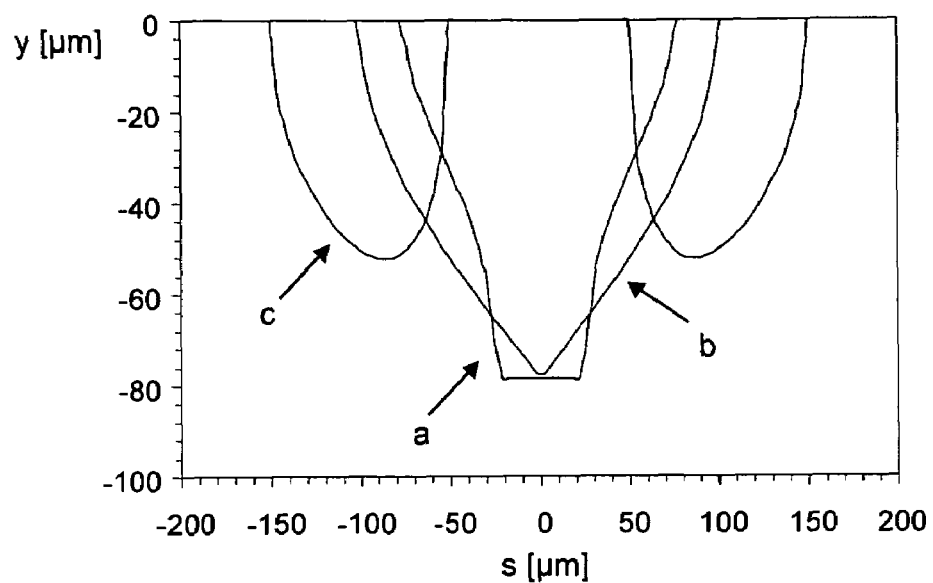
FIG. 2b is a graph of a trench profile obtained with a laser beam having a beam diameter $\phi_{beam}=100$ μm, an ablation depth per unit of time k=5.0 μm/s, a contour velocity of a stage v=10 μm/s, and a contour diameter D=50 μm (a), 100 μm (b) and 200 μm (c) for a scanning contour ablation technique, according to an example.

For a typical beam diameter of 100 μm, an ablation rate of 5.0 μm/s, and a contour velocity of 10 μm/s of the stage, the resulting profile for D values of 50, 100, and 200 μm, respectively D<$\phi_{beam}$, D=$\phi_{beam}$, and D>$\phi_{beam}$, is illustrated in FIG. 2b. For a contour diameter smaller than the beam diameter, a flat central part in the trench can be observed. This property is of particular interest for smoothing purposes in the fabrication process as described in the following sections.

In the case in which a pulsed laser is employed, the ablation depth per unit of time should be replaced by k=df, where d is the ablation depth per pulse and f is the pulse frequency. As a result of the discrete character of the pulsed laser ablation process, the exact trench pattern deviates from the calculated profile obtained with a CW laser. The validity of the CW approach for pulsed operation is discussed below.

Figure 3A:
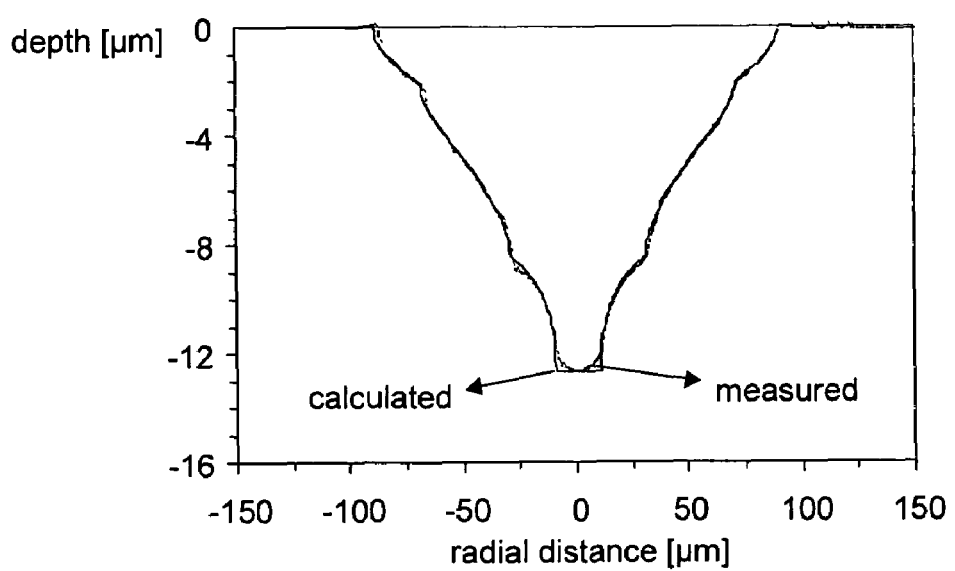
FIG. 3a is a graph that illustrates a comparison between a calculated profile and a measured cross-section for a structure consisting of 2 trenches with contour diameter D=20 and 40 μm, contour velocity v=50 μm/s, ablation depth per pulse d=0.084 μm, and pulse frequency f=20 Hz obtained with scanning contour ablation, according to an example.
Figure 3B:
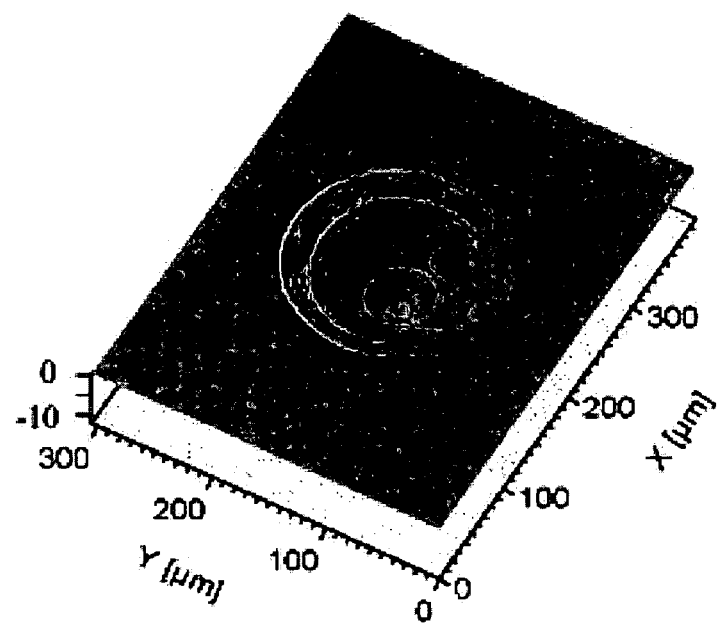

FIG. 3a illustrates a calculated profile based on equation [1] and a measured cross-section for an ablated structure consisting of two trenches with different diameters obtained with a pulsed excimer laser. Very good agreement between both theoretical and experimental values can be observed, except for the steep walls around the central part. At the central part, a slight deviation is noticed due to rounding of the sharp edges by the ablation process. It is to be noted that the second contour is created with D=40 μm. FIG. 3b illustrates an image of the surface of this structure obtained using confocal microscopy.

An arbitrary microlens shape can be obtained using a well-considered combination of concentric trenches with profiles as described above. Therefore, an optimization of the contour diameters and velocities is required. These diameters determine the overlap between the neighboring trenches and can be chosen to achieve a smooth surface in accordance with the intended microlens shape, which mathematically can be represented by $Y_{desired}$, while the scan velocities determine the overlap of the successive pulses in one trench and, consequently, also its depth. This optimum set of contours minimizes $$\varepsilon = \int_0^{r\,max} \left| Ydesired(r) - \sum_i y_i(r) \right|^n 2\pi r\, dr \quad [2]$$

where $y_i$ is the trench profile for the i-th trench with diameter $D_i$ and velocity $v_i$ mathematically described by equation [1], and n is an integer value (n=1, 2, . . . ).

The integral is evaluated over the one-dimensional lens section. Generally, the central part of the lens is more important than the periphery; therefore, an advantage can be taken by introducing a weighing factor in the integral. A range of valid diameters and velocities is determined as follows: contour diameters larger than $\phi_{lens}+\phi_{beam}/2$, where $\phi_{lens}$ is the lens diameter, are ignored since they do not overlap anymore with the lens area, and diameter smaller than $D_{min}$ are disregarded as well. This minimum has been introduced to avoid that the sample would be forced to make small contours at elevated speeds, which could cause the stage to stall. However, $D_{min}$ cannot be chosen to be arbitrarily large: typical microlens shapes have a slowly varying central part, meaning that this part will largely be approximated by trenches with D<ϕ. In the discussed optimizations $D_{min}$ was chosen to equal 0.4ϕ, but other values are not excluded.

Concerning the contour velocities, a minimum speed was applied to ensure that a reasonable number of contours are involved. At low speeds, deep and steep trenches are etched and large amounts of polymer material are removed. Intuitively, it can be expected that getting a smooth transition with neighboring, overlapping trenches can be difficult since the ablation process acts differently on sharp edges than on flat surfaces. In addition, part of the ablated material is dropped back onto the nearby polymer surface, potentially blocking future pulses of ablating the covered surface. This effect increases with the amount of material taken away in every trench.

The choice for the maximum scanning speed value should be based on the following considerations: if the trench profiles can be accurately described by equation [1], higher values allow better approximation of the desired profile (lower ε) since the minimum trench depth is lower. In the CW approach, the effect of this parameter can be determined by searching for optimum contour sets with different maximum scan velocities and calculate the rms deviation between the computed approximation and the desired lens profile.

Figure 4:
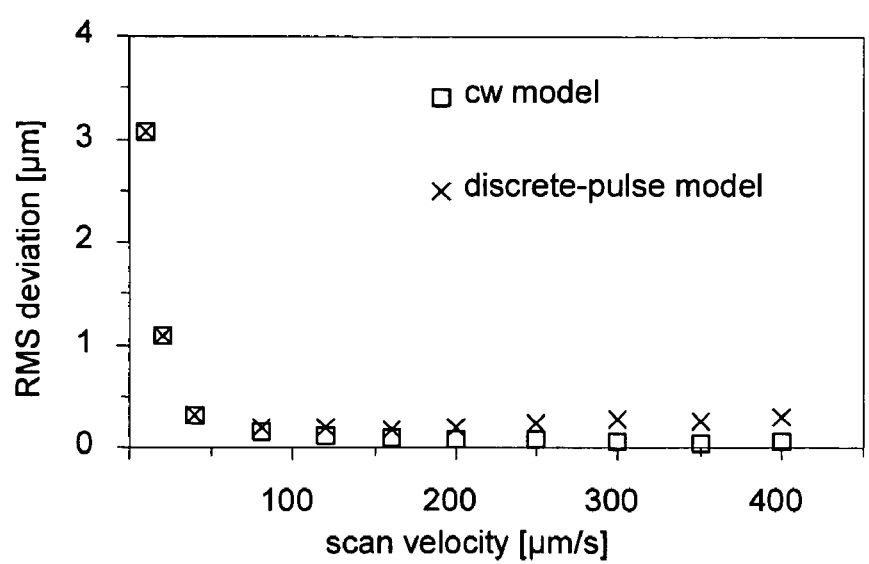
FIG. 4 is a graph that illustrates the calculated rms deviation of the approximating surface according to the continuous working model as used in the optimization algorithm, and according to the discrete-pulse approach for several maximum scan velocities, for a laser ablated surface, according to an example.

This is illustrated in FIG. 4 for a particular lens shape with f=250 μm and $\phi_{lens}$=200 μm. As the contours are assumed to be ablated with a CW laser, the predicted profile is referred to as 'CW approximation.' The deviation between the ideal spherical lens shape and the CW approximation decreases substantially as higher scan speeds are allowed. Other lens dimensions provide analogous results.

A second consideration takes the discrete character of pulsed laser ablation into account: as the scan velocity is increased (while other laser parameters remain constant), less pulses are fired onto the substrate in a single contour movement and the ablated trench pattern shows substantial deviation from the ideal profile as in FIG. 2. The effect of discrete pulse operation on the resulting lens shape can be calculated numerically, based on the geometry of the ablated cavity due to a single-pulse laser shot. The cavity was modeled as a perfectly circular hole with diameter $\phi_{beam}$, vertical sidewalls, and a homogeneous depth d. The positions of the ablated pits were calculated based on the contour diameter, contour velocity, and pulse frequency.

In FIG. 4, the results of these calculations are shown for the same lens as mentioned above, but now the true trench pattern is taken into account in order to compute the ablated surface. This approach is referred to as the 'discrete-pulse approximation.' It is observed that the discrete-pulse approximation worsens when contour speeds above 150 μm/s are present, contrary to what the CW model predicts. Although a simple model for the single-pulse cavity was used, this behavior was qualitatively observed in our experiments.

An algorithm based on simulated annealing was developed to minimize equation [2]. This technique was preferred since it is capable of finding a global optimum and can be easily implemented. It starts with a given set of contours and calculates ε via equation [2] where the integral was replaced by a discrete sum, taken in sample points along the desired profile. In a next step, a new solution is proposed, which corresponds to the former set but a limited number of randomly selected contours have slightly, and again randomly, changed velocities and/or diameters.

A new ε' is calculated and compared with the former value. For ε'<ε the proposed solution is accepted, while in the case ε'>ε acceptance only occurs with a certain probability. This probability decreases with time, eventually terminating the optimization process. Although the user proposes the initial number of contours, the algorithm can freely change this by suggesting velocities and/or diameters outside the valid range. In this case, the parameter will be given a value just outside its range so the contour can always be recalled by only a slight adjustment of one of its parameters. It should be noted that the desired lens is not limited to spherical surfaces only, but can be any arbitrary circular-symmetric form including parabolic, elliptical, and linear profiles.

Figure 5A:
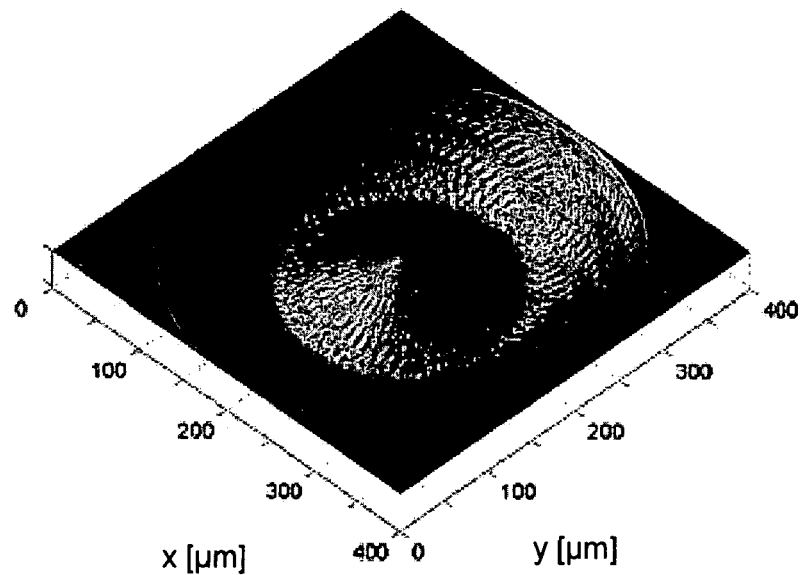
FIG. 5a is a calculated 3D image of a structure created with scanning contour ablation, with a contour velocity of 40-150 μm/s and a diameter range 25-150 μm, according to an example.

An example of a structure approximated by an optimum set is given in FIG. 5a, illustrating a conical structure with its top buried 5 μm below the polycarbonate surface. An aperture of 100 μm was used and 19 contours were required to ablate the full structure. The contour velocity was in the range 40-150 μm/s and the diameter was in the range 25-150 μm. The laser was operated at 20 Hz, taking away a layer of 70 nm per pulse. The time required to ablate the cone was slightly more than 3 minutes. The 3D surface image is calculated based on the fabrication parameters, while the profile was measured with confocal microscopy. Observation of the profile revealed a wall angle of 9.5°, which is very close to the design value of 10°.

Figure 5B:
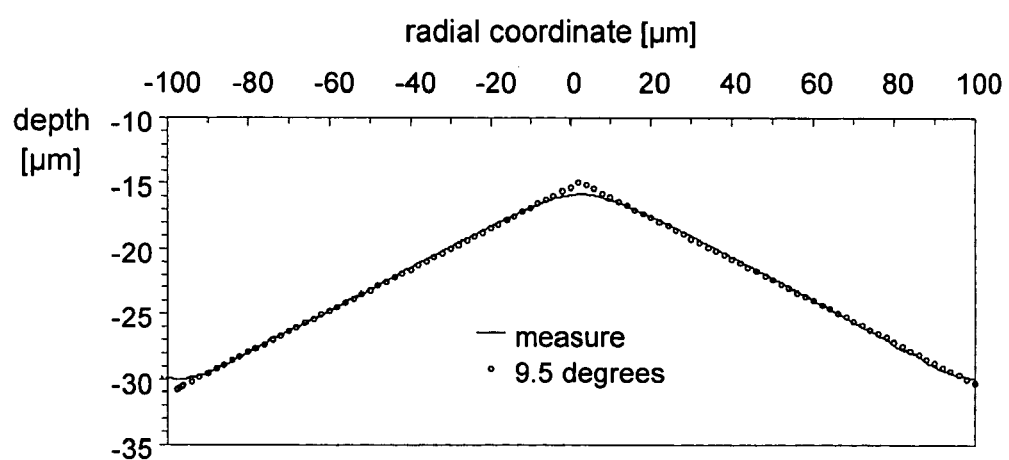
FIG. 5b is a graph of a measured profile of a structure created with scanning contour ablation, with a contour velocity of 40-150 μm/s and a diameter range 25-150 μm, according to an example.

FIG. 5a shows a calculated 3D image of a structure created with scanning contour ablation, while FIG. 5b is a representation of a measured profile of a structure created with scanning contour ablation. As Y(r) is approximated by addition of grooves and since the latter satisfy the expression $p^\alpha(\alpha r) = \alpha p(r)$ with $p^\alpha(r)$ the groove profile for $\phi_{beam} = \alpha \phi_{beam}$ and D=αD, this property is also valid for the final lens shape. For a spherical convex lens shape, for example, this means that the optimum set for a radius of curvature R and diameter $\phi_{lens}$, can also be used for a lens with diameter $\alpha \phi_{lens}$ and curvature αR by multiplying all contour diameters with α.

Figure 6:
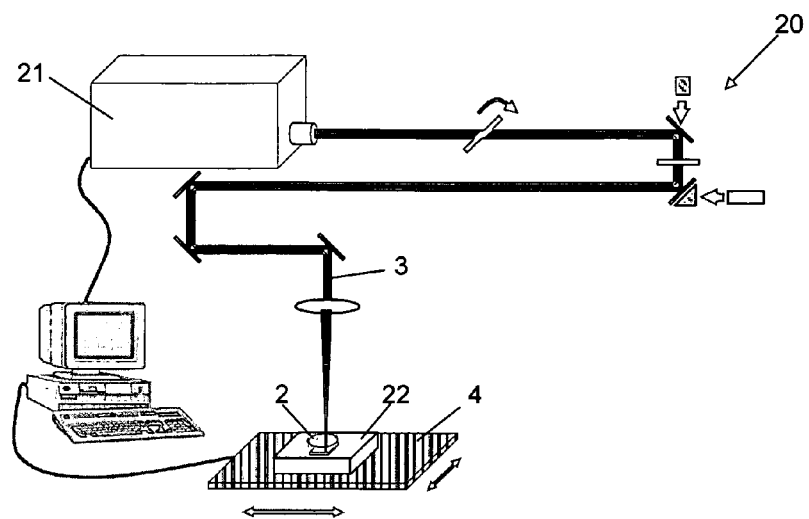
FIG. 6 is a schematic representation of a specific set-up for excimer laser ablation, according to an example.

By way of example, a specific set-up 20 for lens fabrication is illustrated in FIG. 6. In this example, an ArF laser 21 is used. The ArF laser 21 is a Lumonics PulseMaster 848 and beam manipulation is handled by Optec's Micromaster. The sample 2 is put in a chamber 22. The ambient pressure in the chamber 22 is dropped below 100 mbar, while a small flow of helium above the sample removes ablation fumes so they cannot contaminate the UV-window, as this would lead to damage by the laser heating. Chamber connections (i.e., a vacuum pump and a helium inlet) are not shown in FIG. 6. The low ambient pressure considerably reduces debris deposition around the ablated area, as discussed by Berden et al. in Proc. SPIE 4274 (2001) p. 411.

In order to select a homogeneous part of the laser beam, a 2 μm thick film of BCB (benzo-cyclo buthene) on a Si substrate is ablated with multiple pulses. A suitable, homogeneous part of the beam is selected when the film is etched away simultaneously over the entire aperture area since the spin-coated film is highly uniform. The removal of the entire film can easily be observed via the TTL (through-the-lens) camera of the micromachining system.

Figure 7:
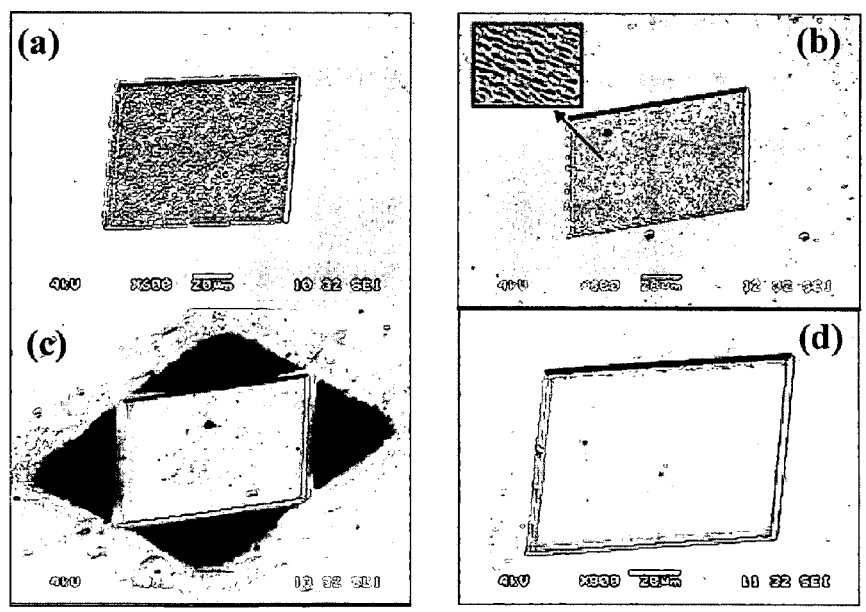
FIG. 7 shows photographs of laser-ablated structures created in different commercial polymer material, ablated using 20 pulses with a fluence of 47 mJ/m$^2$; the commercial polymer material used is PMMA (A), PET (B), polyimide (C), and polycarbonate (D)

A number of optically transparent and high quality commercial polymers can be used for microoptics fabrication, such as polycarbonate, polyimide (Kapton), PMMA, and PET. These polymers were tested on their suitability for micro-machining with excimer lasers, and photographs of the created structures are shown in FIG. 7. PMMA was found to show incubation effects (i.e., ablation only starts after a few pulses for low fluences), meaning that the ablated depth is not unambiguously determined by the pulse count, and a rather rough machined surface is obtained, as can be seen in FIG. 7(A). PET develops a particular structure (i.e., an oriented rippled surface) on the bottom of the ablated area, as can be seen in FIG. 7(B), which makes it unsuitable for optics. Polyimide, commercially available as Kapton, produces a lot of debris during ablation, as can be seen in FIG. 7(C) and its yellow color makes it less attractive for optical purposes.

Polycarbonate does not show any incubation, even at fluences close to the threshold for ablation, as can be seen from FIG. 7(D). The ablated surface is very smooth and flat. Multiple pulse ablation showed that the rms surface roughness flats out to 1.3% of the ablated depth for static ablation. Since no homogenizer was available in the set-up used to create the structure, it is to be expected that this value decreases substantially for scanning ablation.

Figure 8:
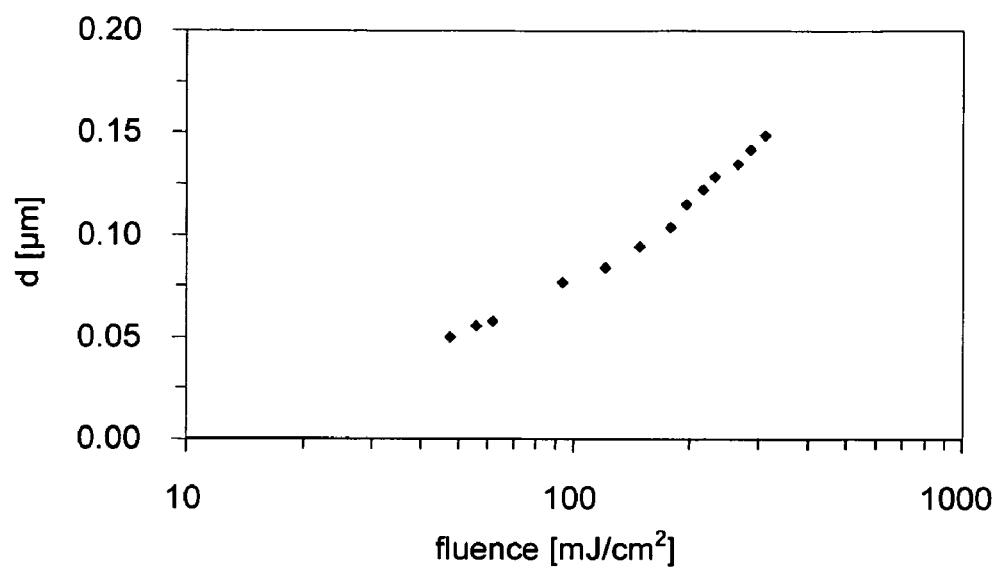
FIG. 8 is a graph that shows etch depth per pulse versus the laser fluence for ablated polycarbonate using an ArF excimer laser, according to an example.

Etch depth per pulse versus ArF laser fluence was measured for this material and is given in FIG. 8. Next to its ablative qualities and low water absorption, the optical properties such as little haze, high transmission and a spectral passing band from 360 nm to 1600 nm, and thermal properties (i.e., mainly a high upper working temperature of 115-130° C.) make polycarbonate a very suited candidate as a substrate material for microoptics. The polycarbonate samples used were films with a thickness of 500 µm obtained from Goodfellow Inc.

Using equations [1] and [2], contour sets for spherical lenses with different focal lengths can be calculated. The obtained results are shown in Table I. In this case, the desired lens shape can be defined as:

$$Y_{desired}(r) = -(\text{offset} + R - \sqrt{R^2 - r^2})$$

in which the minus-sign clearly indicates that lenses are buried below the sample surface and offset equals the depth of the center of the lens. For every radius of curvature R, the optimization procedure is reiterated 20 times and the best approximation (minimum $\epsilon$) is selected for fabrication.

TABLE 1

| design R (µm) | lens height (µm) | # contours | rms deviation * (µm) |
|---|---|---|---|
| 125 | 50 | 37 | 0.129 |
| 150 | 38 | 30 | 0.130 |
| 175 | 31 | 25 | 0.131 |
| 200 | 27 | 22 | 0.120 |
| 250 | 21 | 20 | 0.118 |
| 300 | 17 | 19 | 0.096 |
| 400 | 13 | 15 | 0.110 |
| 600 | 8 | 13 | 0.113 |
| 800 | 6 | 12 | 0.105 |
| 1000 | 5 | 10 | 0.101 |
| 1500 | 3 | 9 | 0.101 | optimization parameters: ν range:
40–150 µm/s, f = 20 Hz, φ = 100 µm, d = 0.07 µm
* calculated values according to the 1D model Table 1 summarizes the results of the calculated lens characteristics and optimization parameters for lenses with radius of curvature R between 125 and 1500 µm, to be fabricated with an aperture of 100 µm. The optimization proceeded in two steps: first the contour velocity is kept fixed at 100 µm/s, while the diameters were optimized. In a second phase both parameters are allowed to vary. However, the starting temperature of the simulated annealing procedure is chosen considerably lower this time and the contour set is fine-tuned. This approach produced very reasonable results in practice with typical calculation times of the order of a few minutes per iteration.

The calculated sets were used for making lenses in polycarbonate with a pulsed ArF excimer laser operating at 193 nm. Although the optimization procedure was based on a range of contour velocities between 40 and 150 µm/s, this range can be scaled according to the true ablation depth per pulse and desired pulse frequency. Every trench ablation starts at a random place around the center of the lens and the full contour is scanned twice by the laser at twice the prescribed contour speed. As the set-up lacks an electronic shutter for the laser beam, this approach helps to spatially average out the effects of fluence fluctuations due to the discontinuous laser operation.

For clarity reasons, scanning speed values mentioned herein refer to the single-contour speeds. The fabrication process is performed in two phases: in a first stage, the sample surface is ablated via the scanning contour method, based on the optimum contour sets as described previously. The result is a surface with a lot of debris and with a texture in which the individual pulses can be distinguished. In a second phase, optical finish of the lens surface is achieved by ablation of the entire lens area with a large beam aperture. During this process, the sample is contoured with a small diameter, typically 20 to 30 µm. In this way a structure similar to the structure shown in FIG. 2b is ablated on top of the lens with the central flat part at least equaling the lens area.

Three distinct effects are achieved in this way. First, debris is ejected from the lens surface and forced to leave the lens area and is deposited near the ablated zone. Second, as spatially rapidly varying features ablate faster than smooth surfaces, the surface gradually becomes smoother. It is believed that this smoothing during material removal is due to the presence of a thermal component in the photo-ablation process. Third, as a layer of polycarbonate is physically removed during the surface smoothing, it is important that the large laser beam is as homogeneous as possible in order not to deform the lens shape. Since the set-up used lacks a beam homogenizer, the contouring of the smoothing beam ensures that the laser fluence is spatially averaged over the lens area.

Figure 9A:
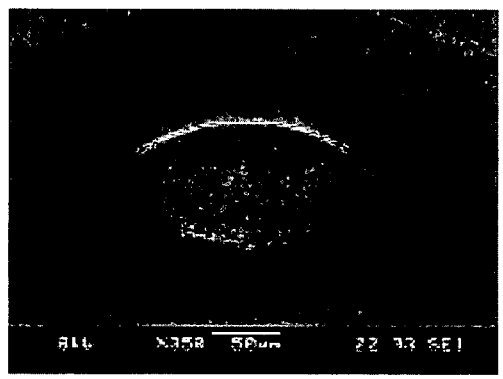
FIGS. 9a and 9b each show a photograph of a microlens having a radius of curvature R=800 μm before (a) and after (b) lens smoothing, according to an example.
Figure 9B:
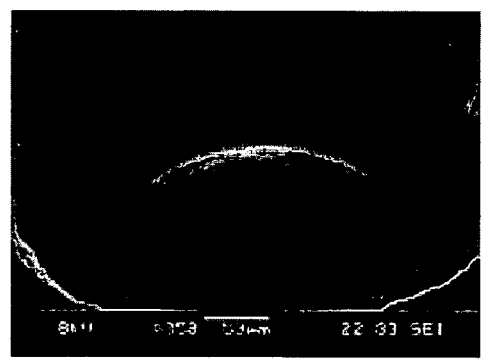

During this process, a laser fluence of 140 mJ/cm$^2$ was used, taking away a layer of almost 18 µm (200 pulses). Drilling the lens structure less deep still left the discrete pulse pattern in the surface. FIG. 9 illustrates the effect of this 'cleaning' procedure. A smooth surface buried in the polymer surface and surrounded by a steep wall is accomplished after smoothing the surface. Debris is deposited close to the smooth area.

TABLE 2

Microlens fabrication parameters.

| design R (µm) | Measured f (µm) | f-number[3] | Fabrication time[4] |
|---|---|---|---|
| 125 | 155 ± 11[1]/151 ± 14[2] | 0.8 | 06 m 03 s |
| 150 | 195 ± 11/189 ± 13 | 1.0 | 04 m 35 s |
| 175 | 250 ± 13/244 ± 6 | 1.3 | 03 m 55 s |
| 200 | 317 ± 12/309 ± 6 | 1.7 | 03 m 19 s |
| 250 | 407 ± 14/399 ± 9 | 2.1 | 02 m 44 s |
| 300 | 488 ± 17/480 ± 9 | 2.6 | 02 m 37 s |
| 400 | 678 ± 23/666 ± 11 | 3.6 | 01 m 57 s |
| 600 | 1023 ± 36/1000 ± 14 | 5.4 | 01 m 38 s |
| 800 | 1366 ± 57/1333 ± 38 | 7.2 | 01 m 24 s |

TABLE 2-continued

Microlens fabrication parameters.

Figure 10A:
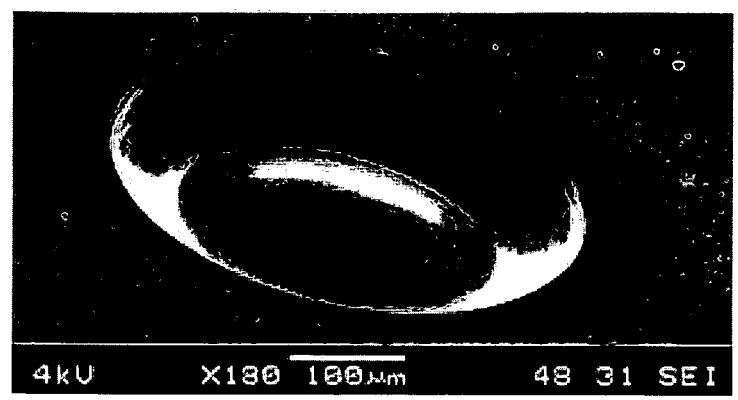
FIG. 10a shows a spherical microlens fabricated in polycarbonate using scanning contour ablation, according to an example.
Figure 10B:
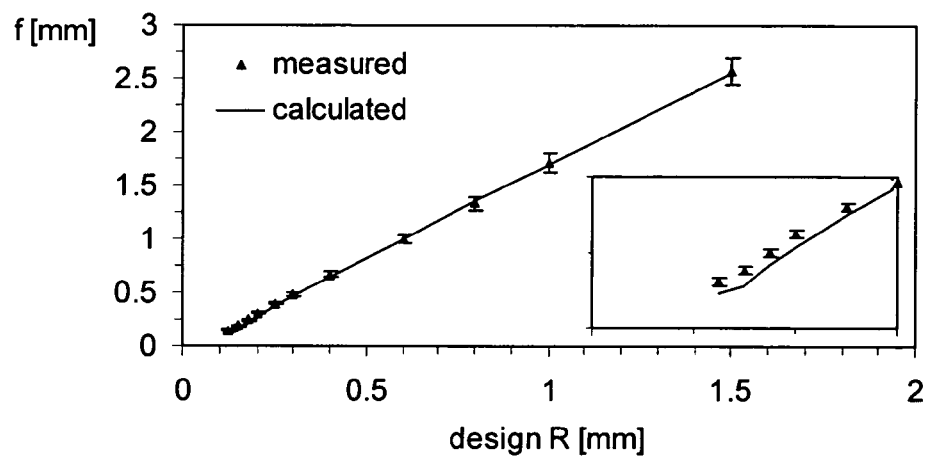
FIG. 10b is a graph that shows the measured versus calculated focal lengths, averaged over all etch rates, according to an example.

| design R (μm) | Measured f (μm) | f-number[3] | Fabrication time[4] |
|---|---|---|---|
| 1000 | 1770 ± 94/1717 ± 53 | 9.3 | 01 m 13 s |
| 1500 | 2650 ± 125/2580 ± 55 | 13.9 | 0 m 59 s | fabrication parameters: f = 20 Hz, φ =100 μm, fluence = 50–177 mJ/cm$^2$, d = 0.051–0.103 μm
[1]values of f are averages (and standard deviations) over lenses made with 6 different laser fluence levels (50, 62, 78, 101, 134, and 177 mJ/cm$^2$) respectively d equalling 51, 59, 67, 78, 89, and 103 nm.
[2]values of f are averages (and standard deviations) over lenses made with 4 different laser fluence levels (62, 101, 134, and 177 mJ/cm$^2$) respectively d equalling 59, 78, 89, and 103 nm.
[3]focal number calculations are based on the central lens area selected for aberrations measurement, which was set to a diameter of 190 μm.
[4]based on d = 0.103 μm, f = 20 Hz Table 2 gives the fabrication times for the different lenses and summarizes the properties of the ablated lenses. In FIG. 10a, a SEM picture of one of the fabricated lenses is shown. In FIG. 10b, the focal lengths of the lenses were measured using a fringe count on the lens surface with the interferometer and compared to calculations for spherical lens shapes with the same radius of curvature R. These calculations were performed by a commercial raytrace tool (ASAP, Breault).

As the numerical aperture (NA) of the interferometer objective was limited to 0.4 (20× magnification), a microscope was used to determine the position of the focal spots for the fast lenses (radius of curvature R=125, 150, and 175 μm) illuminated with a white-light collimated source. Agreement between measured and calculated focal lengths can be observed for radius of curvature R>250 μm, indicating that the fabrication process is quite accurate. Only for the fastest lenses (f/0.8-f/1.3) are the predicted values are below the measured values.

Figure 11A:
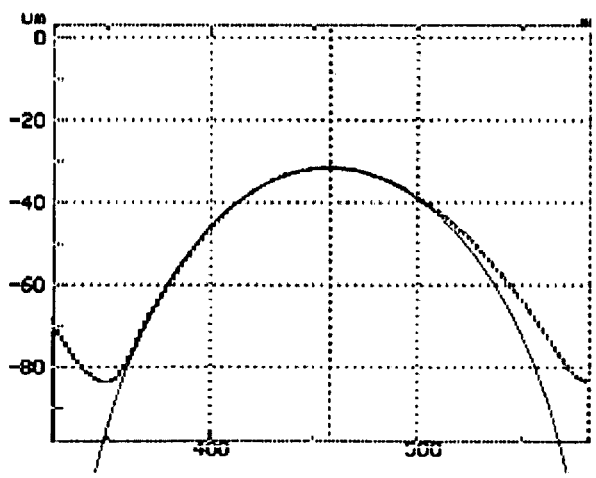

It is believed that rounding of the rim of the lens by the ablation process is responsible for the longer focal lengths. Due to the high numerical apertures, it was impossible to verify this belief using optical profilometry. However, with a contact profilometer the lens surface could be measured and its profile compared to a spherical lens shape with radius of curvature R=125 μm. The results are shown in FIG. 11a to FIG. 11c. FIG. 11a is a lens profile for a lens with radius of curvature R=125 μm. FIG. 11b illustrates a photograph of the lens surface. FIG. 11c illustrates a SEM photograph of a scanning contour ablated lens.

The too slow descending part of the measured profile (right flank) should be ignored since it is equipment-related as verified by rotating the lens (e.g., 180 degrees). As can be seen from the left rising flank, the rim of the lens proves to be slightly less steep as expected for a spherical lens, causing the focal point to shift to higher values. Similar observations were made for lenses with radius of curvature R=150 μm.

The lenses were visually inspected with an optical microscope. All lenses had a smooth surface except the fastest lenses with a radius of curvature R=125 μm. In these lenses, an irregular structure was observed at the edge of the lens and small, radially oriented grooves were seen on the surface away from the center. Although the exact nature of both observations is not entirely clear, it is expected that the irregularities at the lens rim are caused by ablation at the edge of the beam aperture on a steep surface while the grooves are likely due to beam reflection at the crater walls outside the lens area. As the surface becomes smoother when the lens is driven deeper into the surface, the reflection will increase substantially. For higher radius of curvature R, the wall angle is not suited anymore for deflecting the laser beam towards the lens surface.

During characterization of the lenses, a noticeable difference in the measured focal lengths for the (assumed) etch rates 51 and 67 nm/pulse was observed. The focal lengths versus radius of curvature R exhibit the same linear behavior, but with a different slope. Excluding the results for these etch rates considerably decreases the standard deviation (Table 2). As the different behavior for these etch rates cannot be explained based on physical arguments, it is expected that they are caused by a deflection in the fluence level of the laser during their fabrication. As all the fluence and etch rates were determined off-line (i.e., before any of the lenses were made), an inaccurate adjustment in the beam attenuator is likely to be the cause. The questionable etch rates are further excluded from the measurement results.

In order to optically characterize the lenses, Mach-Zehnder interferometry was used for wave front aberration measurement and, to a lesser extent, optical profilometry and SEM for analysis of the surface profile. As the microlens is buried in a polymer film, the measured wave front aberrations account for the planoconvex lens with the flat polycarbonate interface at one side and the curved microlens surface at the other side. The wave front was evaluated at the exit pupil of the lens for a spherical incident wave front from the focal point at the flat interface side. All measurements have been limited to the central 90% of the lens (diameter of 190 μm). After the measurement, the wave front is fitted to a Zernike polynom (i.e., 10th degree to ensure a sufficient fit) in order to calculate the aberrations. The rms values produced by this fit are described in this section. As the interferometer uses a helium-neon laser with λ=632.8 nm, all aberrations values are expressed in this wavelength.

The results of the measurements are summarized below and used for discussion of some important laser parameters in scanning contour ablation. The experiments have been limited to single aperture and lens diameter values. All lenses had a diameter of 200 μm, a size which is compatible with standard pitches of 250 μm in VCSEL or LED arrays for telecom purposes.

From a fabrication point of view, the diameter of the machined surface is of little importance as long as the area fits within the beam used for smoothing the lens surface (which on its turn is limited by the homogeneous part of the laser beam). However, the calculation of the contour set can become more time-consuming as the spatial extent of the lens shape becomes larger and has to be evaluated at more locations.

Concerning the aperture diameter, it should be noted that with a micro-machining system based on projection optics, non-uniform etching close to the edge of a drilled hole can be observed (diffraction of the beam). This effect tends to become more important as the aperture is decreased and eventually dominates the surface finish of the hole for small aperture diameters (below 10 μm). For this reason, a rather large beam size of 100 μm has been chosen to make the lenses. A smaller aperture also implies a longer fabrication time as the total amount of material removed per pulse decreases. Although the latter scales as $\phi^{-2}_{beam}$, this is not entirely the case for the quantity of useful removed material ablated within the lens area. For example, a lens with lens diameter $\phi_{lens}$=200 μm, radius of curvature R=800 μm, and depth of the center of the lens offset=5 μm, is fabricated in an ablation system with pulse frequency f=20 Hz and ablation depth per pulse d=0.05 µm in 2 minutes with a 100 µm aperture (1462 pulses), while a 50 µm aperture requires 5 minutes (3678 pulses).

Before summarizing the results of the Mach-Zehnder (MZ) interferometric measurements, it is to be emphasized that a number of technological issues also influence the lens quality and, thus, the aberration measurements. These technical issues include accuracy of the contour movement by the stage which is limited by backlash; finite resolution and vibrations due to resonance effects; pulse-to-pulse fluence variations resulting in ditto etch depth spread; timing-jitter between the stage movement and the laser firing leading to non-equidistant pulses on the sample; and non-uniformity of the beam. These issues cause a noticeable spread on the aberration measurement results.

Figure 12:
Figure 12:
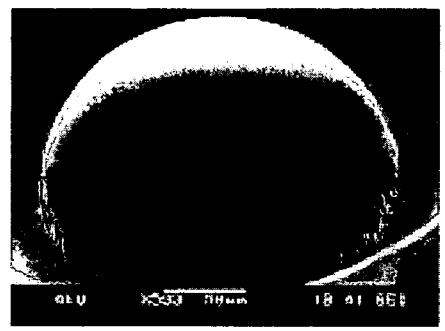
Figure 12:
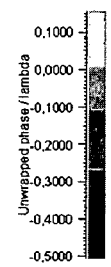
Figure 12:
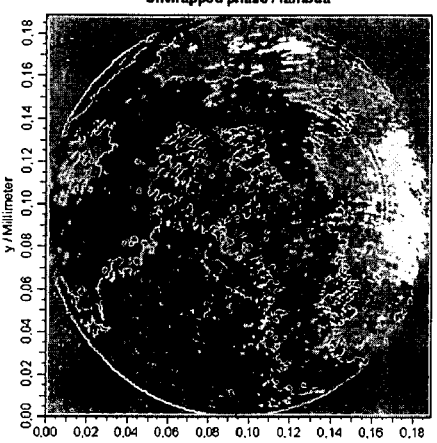
Figure 12:
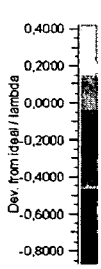
Figure 12:
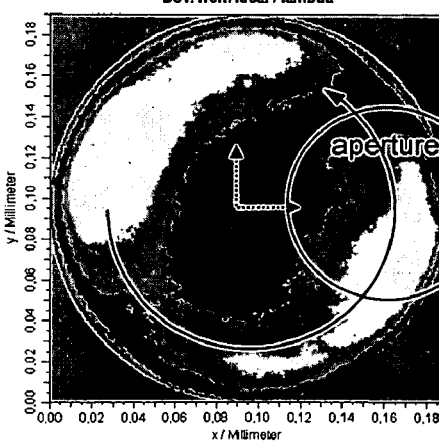

Typical measurement results as produced by the MZ interferometer for the ablated lenses are given in FIG. 12. Particular interest should be focused on the wave aberrations in FIG. 12(b). Similar distributions were measured for a large number of lenses. Since these aberrations are not circular-symmetric, pulse-to-pulse fluence variations and timing-jitter that would occur randomly on the lens surface, and beam non-uniformity can be excluded since the aberration is point-symmetric. The only plausible cause is a considerable amount of backlash in the stage drive on the x-axis, which was confirmed by measured values of more than 4 µm depending on the exact location of the stage on the x-axis.

Figure 13:
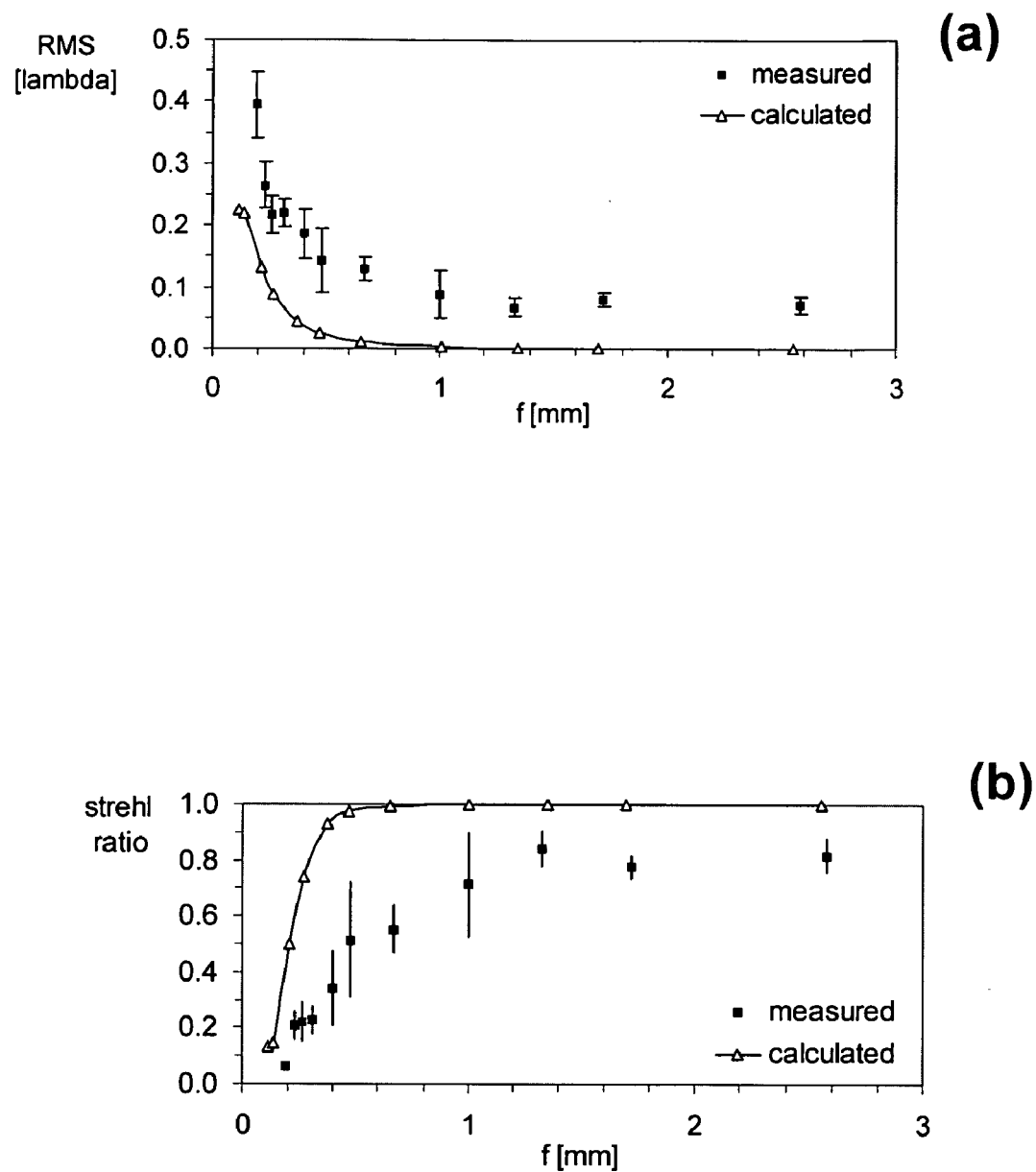
FIG. 13 shows rms values of wave front aberrations of ablated lenses (a) and their corresponding strehl ratios (b) for different focal lengths, for ablated lenses, according to an example.

FIG. 13 illustrates measured rms wave front aberrations and corresponding strehl ratios of the ablated microlenses (averaged over several etch rates), compared to values calculated by ASAP from Breault Research for ideal spherical lenses. High strehl ratios can be achieved for slow lenses. Peak values were reached for the etch rate of 59 nm/pulse with values up to 0.93 corresponding to rms aberrations below 0.05 $\lambda$.

Figure 14:
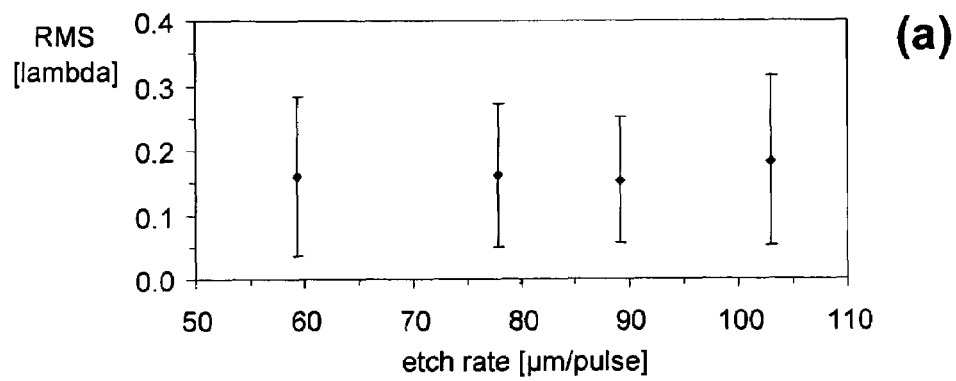
FIG. 14 shows rms values of wave front aberrations averaged over all lenses (a) and rms values of wave front aberrations averaged over all lenses with f-numbers of f/5.0 or higher (b) as a function of the etch rate, for ablated lenses, according to an example.
Figure 14:
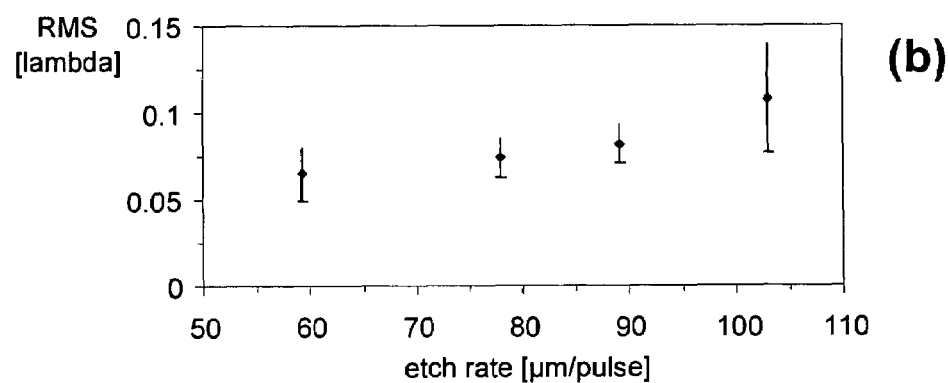

Within the laser fluence measurement range (i.e., about 60 to 180 mJ/cm$^2$), limited by the attenuator range for a demagnification of 5×, etch rates between 59 and 103 nm/pulse could be obtained. In FIG. 14, the results are summarized, averaged over all lenses and lenses with focal numbers of f/5.0 or higher respectively. The latter shows that the aberrations (and their spread) tend to increase as the etch rate is enhanced. This can be intuitively understood as lenses with high f-numbers require little material to be ablated and, thus, a small number of contours with high corresponding scan velocities. With higher etch rates, the latter will increase even more, resulting in higher surface roughness (as previously indicated in FIG. 4). A second effect is that every pulse has a higher impact on the overall lens shape as more material is being removed per pulse. Thus, fluence variations and stage positioning errors become more relevant and this will increase the spread on the aberrations.

Figure 15:
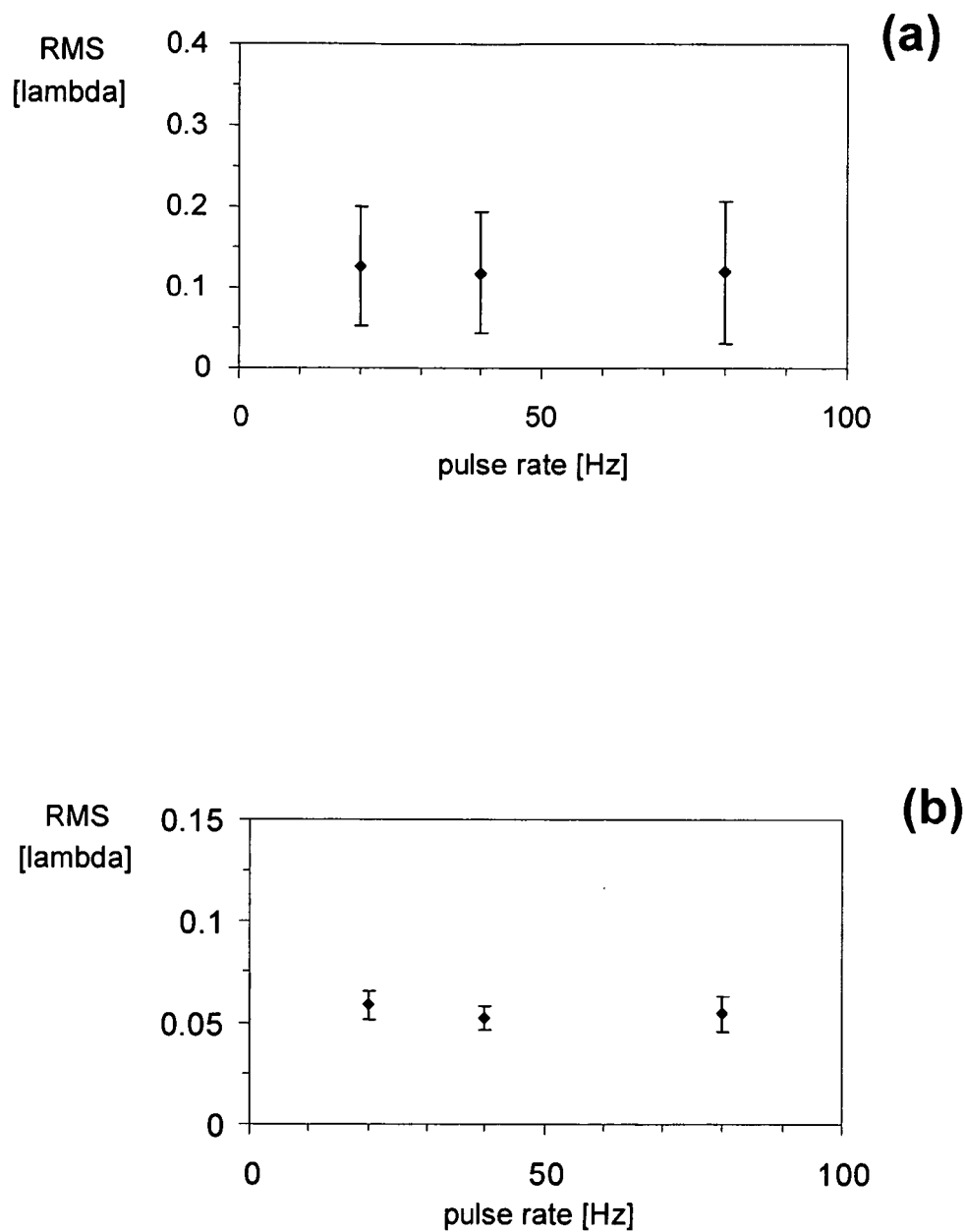
FIG. 15 shows rms values of wave front aberrations averaged over all lenses (a) and rms values of wave front aberrations averaged over lenses with f-numbers of f/5.0 or higher (b) as a function of the pulse rate, for ablated lenses, according to an example.

The influence obtainable by adjusting the pulse frequency is particularly interesting since it decreases the fabrication time just like the etch rate, but now the pitch between successive pulses remains constant. As can be seen in FIG. 15, the pulse frequency does not change the surface quality noticeably. It is to be noted that within the applied pulse frequency range, no change in the etch rate can be detected in accordance with previously reported results for polyimide and PMMA, as discussed by Burns and Cain in J. Appl. Phys. 29 (1996) p1349-1355.

Once a lens requires ablation, a decision has to be made concerning the sequence of the contours. Three options were investigated: writing the trenches in (1) random order, (2) in order of increasing diameter, and (3) in order of decreasing diameter. From a processing point of view, it is not clear which approach is best. For instance writing the central part of the lens first allows accurate profiling of this area as initially a flat-surface free of debris is present and as no steep edges are ablated in this region. However, as the ablation progresses towards the outer region of the lens, debris is deposited on the central part, which needs to be removed. The inverse approach first ablates the deeper parts of the lens and gradually moves towards the central part. Although the central part will be initially covered with debris, towards the end of the processing the central part becomes clear again due to ablation in that area. However, the present debris can cause the surface shaping to be less accurate centrally, which in turn degrades the optical functionality.

Figure 16A:
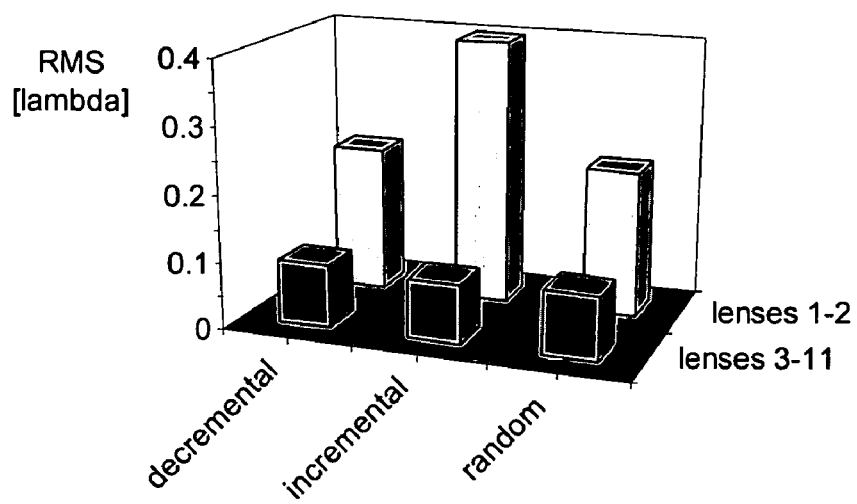
FIG. 16 shows rms wave front aberrations for several contour sequences (a) and wave front aberrations for a lens (f/0.8) with increasing contour sequence (b) for-ablated lenses, according to an example.
Figure 16B:
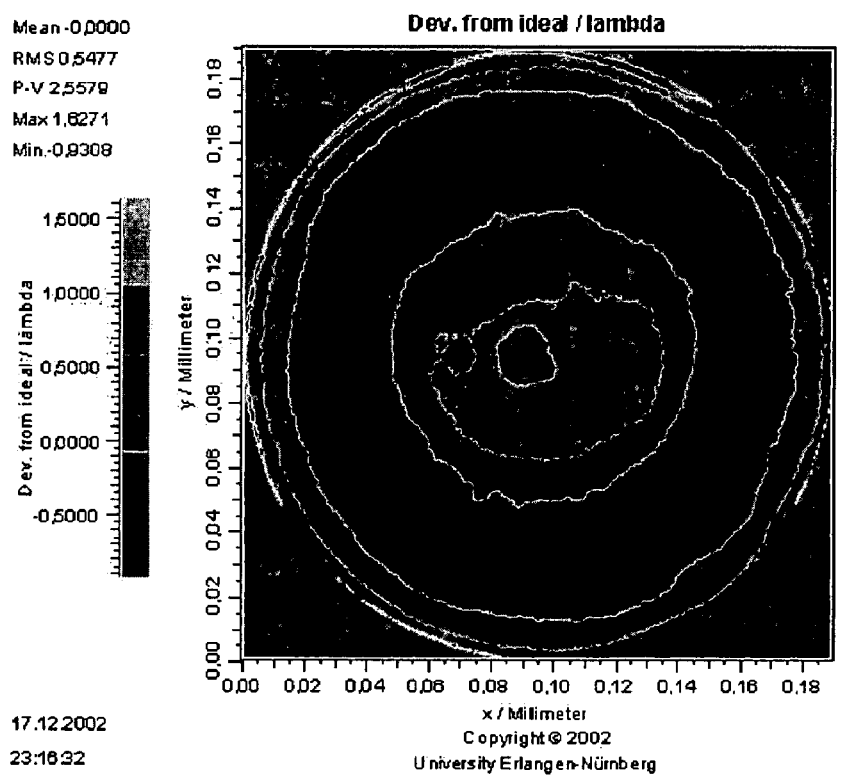

These effects highly depend on the f-number of the lens. High f-number values mean slowly varying lens profiles, which requires little ablation and, as a consequence, the amount of debris is very limited and no steep edges are to be expected in the surface under ablation. However, for fast lenses there is an entirely different situation, as depicted in FIG. 16. It appears that writing the lens randomly or from the rim towards the center is preferred.

The similar lens quality for random and decreasing sequence can be understood by the fact that a considerable higher amount of material has to be ablated at the rim of the lens. This means that most contours have large diameters and, thus, the random sequence case differs little from a decreasing sequence: many large contours in succession alternated with a small contour from time to time. As can be seen from FIG. 16, part of the aberrations comes also from the center of the lens in the case of increasing contour sequence, an observation which was not made for the other contour sequences.

Figure 17:
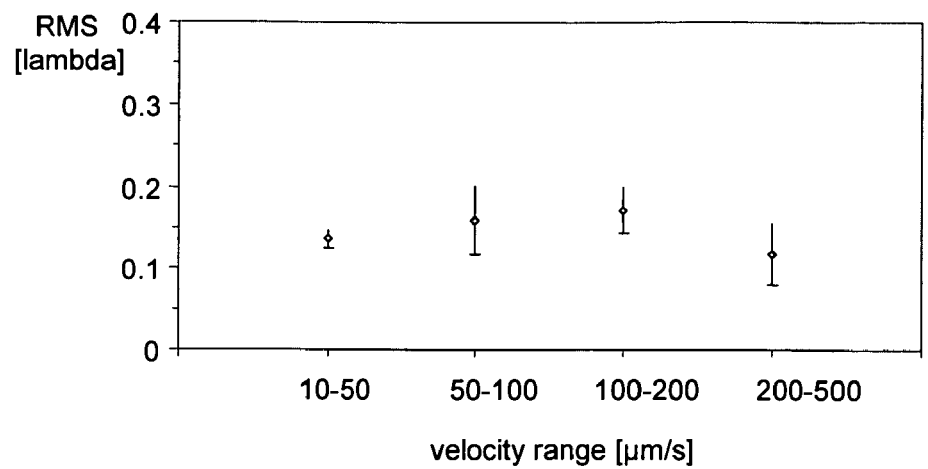
FIG. 17 illustrates rms wave front aberrations for different contour velocity ranges, for ablated lenses, according to an example.

All experimental results described as follows refer to lenses fabricated with the decreasing contour sequence. In order to check the influence of the velocity range used, an optimum set for a lens with radius of curvature R=250 µm was calculated with the single-contour speeds within the following ranges: 10-50, 50-100, 100-200, and 200-500 µm/s. Every lens was fabricated four times under similar conditions and the reported results are averaged values. The corresponding results are shown in FIG. 17.

Contrary to the case in which etch rate, or its equivalence laser fluence, was varied, a different optimum set is calculated for higher scan velocities and etch rate remains constant at 76 nm/pulse. Aberrations do not seem to depend on the chosen scan velocity range, although the spread on the results seems to have increased. These results are in accordance with the results shown in FIG. 4 (i.e., increasing the scan velocity allows the algorithm to find a contour set which forms a better 1-D fit to the desired lens shape in comparison to lower scan velocities). However, as the distance increases between successive pulses, rms roughness increases for a given ablation depth.

Figure 18:
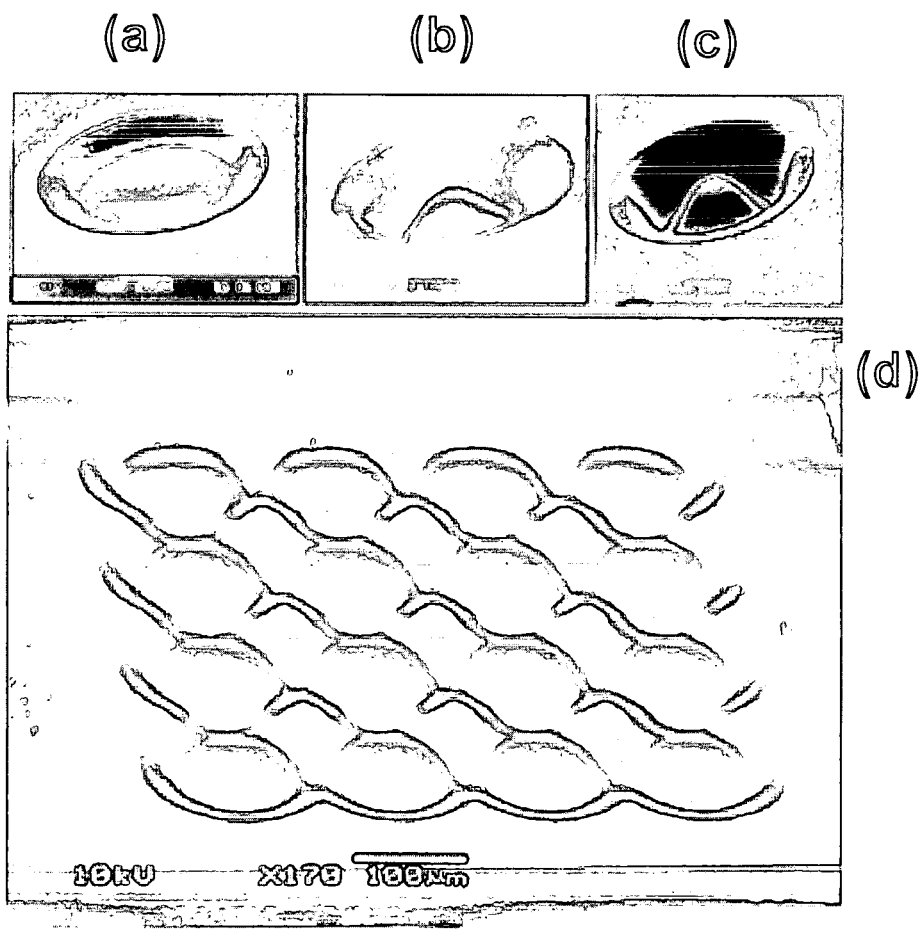
FIG. 18 illustrates non-spherical and non-convex lens shapes: a concave lens (a), a parabolic lens (b), a flat topped parabolic lens (c), and a lens array (d), for ablated lenses, according to an example.

Contour scanning ablation allows for the fabrication of lenses different from spherical, convex shapes in exactly the same way, such as non-spherical lenses and lens arrays. In FIG. 18 a few examples are given. FIG. 18a shows a concave lens, FIG. 18b illustrates a parabolic lens, and FIG. 18c illustrates a flat topped parabolic lens. If the single aperture is replaced by a 2D array of holes in the mask plane, then it is possible to ablate a lens array in essentially the same time as a single lens.

FIG. 18d illustrates a 4×4 lens array with lens diameter 100 µm, pitch 150 µm, and beam aperture diameter 50 µm. The fill factor in this case is 35%. If standard pitches of 250 µm are required, then the maximum achievable fill factor is 28% for a 100 μm aperture or 50% for a 50 μm aperture, if contour diameter ranges are used as described above. It is expected that the surface finish of the individual lenses in the array are similar to the one lens case. Particular attention needs to be paid to the homogeneity of the laser fluence within the entire array area.

Packaged optical modules, such as packaged optoelectronic modules, and methods for producing them, in which a significantly smaller overall alignment error can be achieved are now described. This improvement in overall alignment error is obtained by defining an optical element directly to a packaged optoelectronic module in reference to its alignment features or to the external alignment structures. The optical elements, thus, are defined directly in reference to at least one alignment feature or to at least one external alignment structure.

Figure 19:
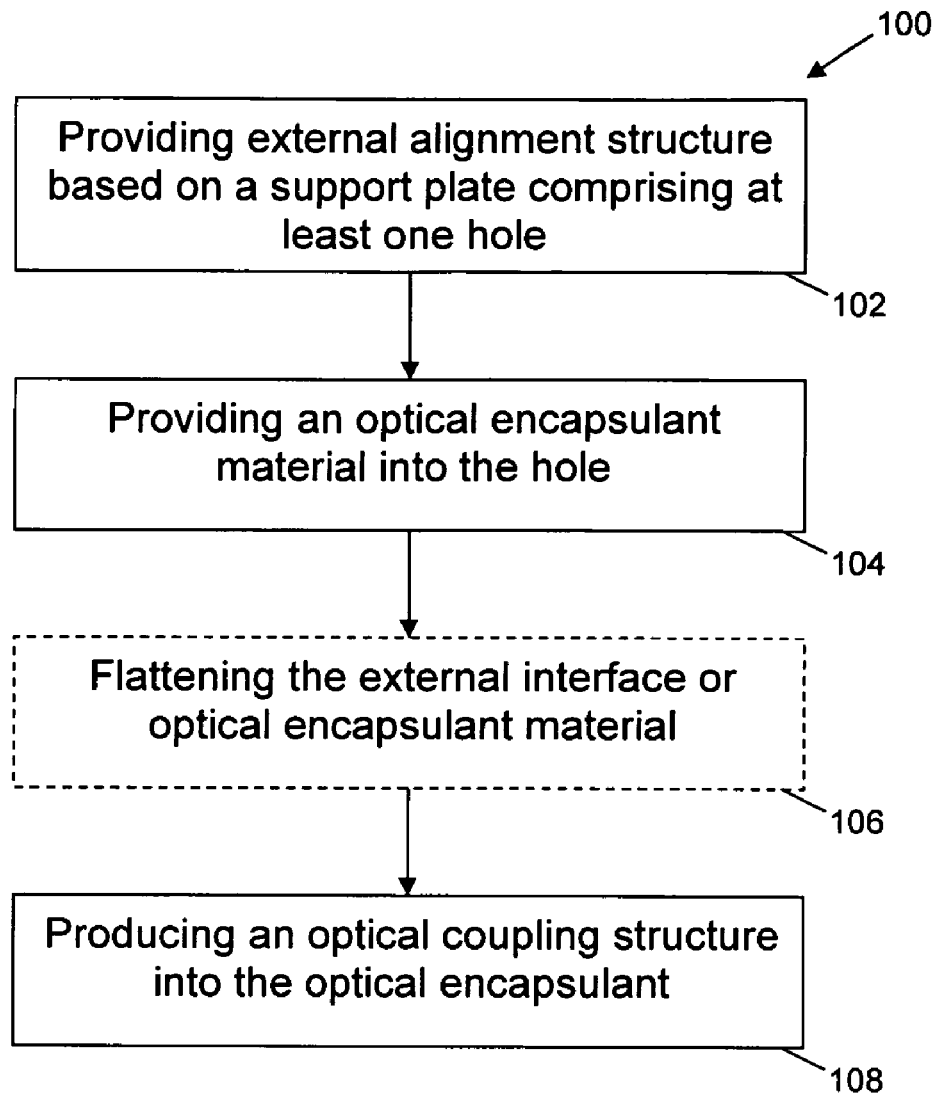
FIG. 19 is a flow chart of a method for providing an optical interface with optical coupling structures or elements in an optical encapsulate material, wherein the position of the optical coupling structures is controlled, according to an example.
Figure 20:
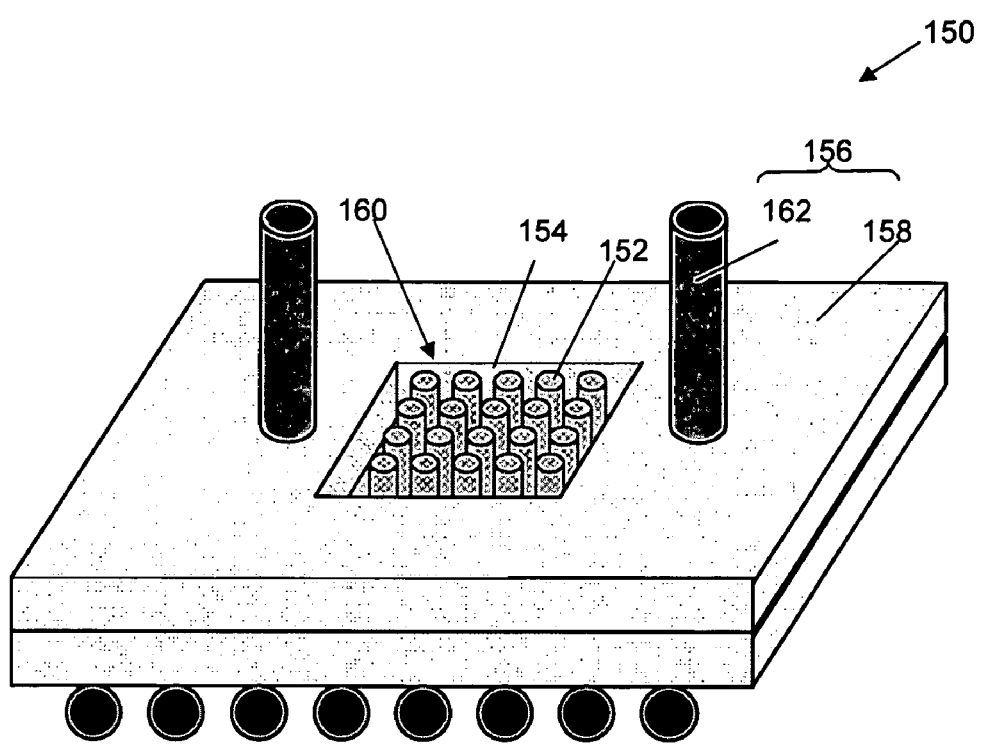
FIG. 20 is a schematic representation of a device with an optical interface with optical coupling elements in an optical encapsulate material, according to an example.
Figure 21:
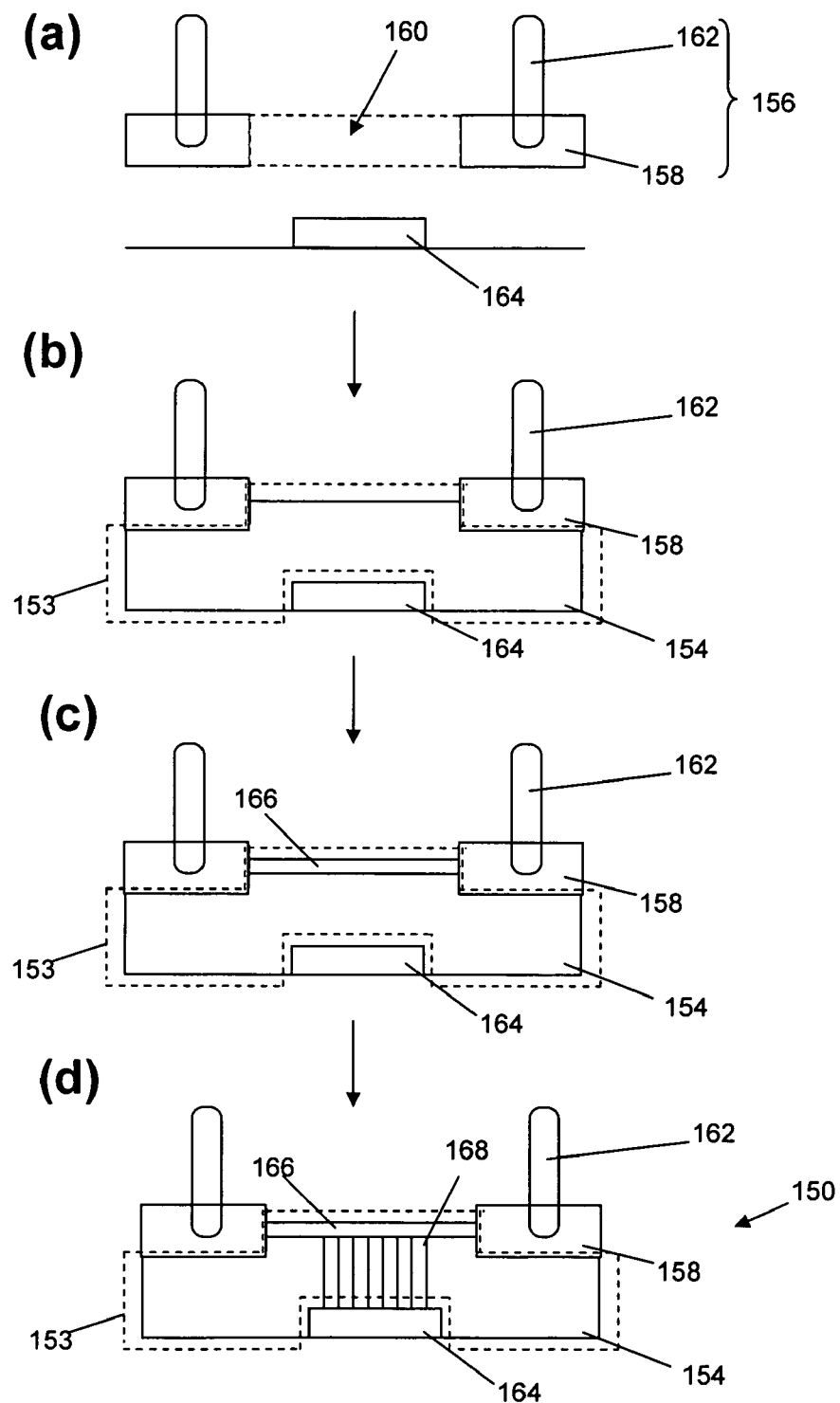
FIG. 21 is a schematic representation of a method for providing an optical interface, according to an example.

A method for providing an optical interface with optical coupling structures in an encapsulation in which the position of the optical coupling structures is controlled is provided. The method 100 for providing an optical interface is shown in FIG. 19. The method is illustrated by way of example for generation of a device 150 having an optical interface with optical coupling structures 152 (as shown in FIG. 20) in an encapsulation 153 (as shown in FIG. 21). The optical coupling structures 152 may be microlenses, mirrors, or wave guides. The position of the optical coupling structures 152 is controlled. The encapsulation 153 includes optical encapsulate material 154.

At block 102, an external alignment structure 156 is provided. The external alignment structure 156 is based on a support means 158 (e.g., a support plate) that has at least one hole 160. The external alignment structure 156 also includes external alignment features 162. At block 104, an encapsulation 153 is provided in the hole 160 of the support means 158. The encapsulation 153 includes optical encapsulate material 154. At block 106, an external surface of the optical encapsulate material 154 is flattened, creating an optically flat external surface of the encapsulation 153. Flattening the optical encapsulate material 154 is optional. Flattening may be performed depending on the quality and flatness of the encapsulation 153 provided at block 104. At block 108, optical coupling structures 152 are produced in the encapsulation 153. The method 100 depicted in FIG. 19 is now discussed in more detail.

The external alignment structure 156, provided at block 102, is based on a support means 158, such as a support plate. The support means 158 can be made of a semiconductor material, such as silicon; a conductive material, such as a metal; an insulator, such as a ceramic; or a polymer. The support means 158 can also be made of any other material that is self-supporting and that has precision mechanical features, such as alignment crosses that are used as reference for the alignment of the support means 158 to other parts, such as an optoelectronic package. Furthermore, the material should be compatible with further processing of the device 150 having an optical interface, such as solder reflow, which is typically performed at a temperature around 280° C.

The hole or window 160 in the support means 158 may have any suitable shape. It can be for instance rectangular or circular, although the invention is not limited thereto. In certain embodiments, the sidewalls of the hole are substantially vertical as compared to the surface of the support means 158. Alternatively, the sidewalls may be inclined.

The external alignment features 162 may be alignment pins. However, any appropriate alignment technique and, thus, any appropriate alignment feature 162 may be used. For example, the external alignment features 162 may be one or more alignment crosses. The external alignment features 162 can extend outside of or be contained within the bounds of the support means 158. This can bring an additional advantage in a later stage by being reusable afterwards for fitting in/on a connector.

If the alignment features 162 are alignment pins, the alignment pins may have any suitable shape in cross-section. For example, the alignment pins may be circular, star-shaped, or cross-shaped in cross-section. The alignment features 162 may alternatively be an acceptor or complementary hole for a multi fibers ferrule, which is flat or has a flat side. The external alignment structure 156 may comprise a combination of different alignment features 162 as described above.

The support means 158 may also include alignment features 162 on one or more sides of the hole 160. For example, the alignment features 162 may be on two opposite sides of the hole 160 and may take the form of alignment pins or alignment holes. As another example, the combination of at least one alignment cross and one or more alignment pins for which their relative position is known within a small error range may be employed.

The optical encapsulate material 154 may be any optically transparent material suitable for sealing optical devices. For example, the optical encapsulate material 154 may be transparent epoxy, acrylate, polyimide, or any other suitable polymer material.

The flat external interface has an rms flatness that may be controlled. The flatness may be below 0.1, 0.2, 0.5, 1, or 2 μm. In one example, the external surface of the encapsulation 153 is aligned with the external interface of the support means 158. The encapsulate material 154 and/or additional material used for flattening the encapsulate material 154 or for providing other properties may substantially fill the hole 160 in the support means 158.

Alternatively, the external surface of the encapsulation 153 is below the external interface of the support means 158. Such an approach may be advantageous when optical elements, such as micro lenses, are formed on the external interface of the encapsulation 153. The distance between the external surface of the encapsulation 153 and the external surface of the support means 158 provides extra flexibility, since it can contribute to the optical object and image distances of the optical system, such as the lens system.

Depending on the flatness of the encapsulation 153, flattening of the optical encapsulate material 154 may be performed. A method of flattening the external interface of optical encapsulate material 154 includes providing a flattening layer 166, such as a polymer layer or film, on the external interface of optical encapsulate material 154. Alternatively, the method of flattening the external interface of optical encapsulate material 154 includes providing a flattening layer on a stamp, pressing the flattening layer on the external interface of the optical encapsulate material 154 by moving the stamp towards the optical encapsulate material 154, curing the optical encapsulate material 154, and removing the stamp.

The thin flattening layer 166 may be chosen to improve the mechanical properties of the encapsulate (scratch resistance, hardness, etc.). The flattening layer 166 may be cyclic olefin copolymers and organically modified ceramics for a good quasi hermetical sealing; polycarbonate for scratch resistance; and polycarbonate, acrylate, cyclic olefin copolymers, polyimide, polystyrene and organically modified ceramics if laser ablation is to be performed.

In the following, a more detailed description of a stamp technique for applying the flattening layer 166 is provided.

The stamp can be made out of glass and, for instance, electrostatic forces can be used to temporarily attach the stamp to the flattening layer 166 for transferring or moving the flattening layer 166 towards the encapsulate material 154. Moving the flattening layer 166 to the external interface may be performed such that substantially no bubbles are captured or formed under the layer or in between the layer and the encapsulate material 154. This may be achieved by bringing the layer very slowly onto the encapsulate material 154, while making a continuous, unimpeded movement (e.g., a movement during which mechanical shocks are not encountered).

In one example, the step of removing the stamp also removes the flattening layer 166. The temporary presence of the flattening layer 166 on the encapsulate material 154 nevertheless may have led to a flattening of the surface of the optical encapsulating material 154. In another example, the step of removing the stamp leaves the flattening layer 166 attached to the cured optical encapsulate material 154. The flattening layer 166 becomes part of the encapsulation 153. In certain examples, the stamp is such that it forms a mask (e.g., it functions as a mask because of its physical structure).

The curing of the optical encapsulate material 154 can comprise different sub-steps. The curing can, for instance, comprise at least one ultraviolet (UV) curing step. The curing can additionally or alternatively include a heating step as a curing step. Those curing steps, especially UV curing steps, may make use of a mask such that at least a partial curing (partially curing in space and/or in time) of the optical encapsulate material 154 is achieved. This may be followed by another (optionally masked) curing step and/or a thermal curing step.

During curing, the refractive index of the cured material is typically increased. This results in a structure with two different refractive indices, allowing the formation of optical coupling structures 152, such as wave-guides, in the polymer encapsulation 153. For instance, UV curing can be used in order to produce Self Written Wave-guides (SWW) in the encapsulation 153. SWWs are discussed further below.

In order to provide good optical coupling, the waveguides may be formed through the encapsulation 153. The wave-guides may be formed using lithographic methods (e.g., making holes by means of etching or laser ablation, and filling the holes with a material with different optical properties, as described with respect to FIG. 23 and FIG. 24; or by making use of an SWW technique, as described with respect to FIG. 21 and FIG. 22). Self written wave-guide techniques are described by Manabu Kagami et al. in Appl. Phys. Lett. 79 (8) (2001) p1079 and Yariv and Kewitsh, Appl. Phys. Lett. 68 p455 (1996). Using such techniques, a wave-guide is formed by selectively illuminating a polymer material with UV light. If the refractive index of the polymer increases during the curing, a self-focusing effect can occur, and the spreading of the light is compensated for by this self-focusing effect.

FIG. 21(a) is a cross-section showing the external alignment structure 156, which includes the support means 158 having a hole 160 and an alignment feature 162. FIG. 21(b) shows the provision of an optical encapsulate material 154, which may cover an optoelectronic device 164.

In passive optical devices, for passive alignment of optical devices and optoelectronic devices, an optoelectronic device 164 may not be present. The material provided in the hole 160 then does not encapsulate an optoelectronic device 164, but still referred to as optical encapsulate material 154 and the corresponding cover extending onto the hole 160 will be referred to as encapsulation 153.

In FIG. 21(c), a flat external interface of the optical encapsulate material 154 is obtained by applying a flattening layer 166 on its surface. The flattening layer 166 may be a polymer layer or film. The flattening layer 166 is part of the encapsulation 153. As discussed above, flattening can be obtained using a stamp technique.

In FIG. 21(d), optical coupling structures 152, such as wave-guides 168, may be provided in the optical encapsulate material 154. For example, self written wave-guides may be formed using a mask. The optical coupling structures 152 are aligned to the alignment features or elements 162. The device 150 having an optical interface, such as the optoelectronic module, may be used as such.

Figure 22:
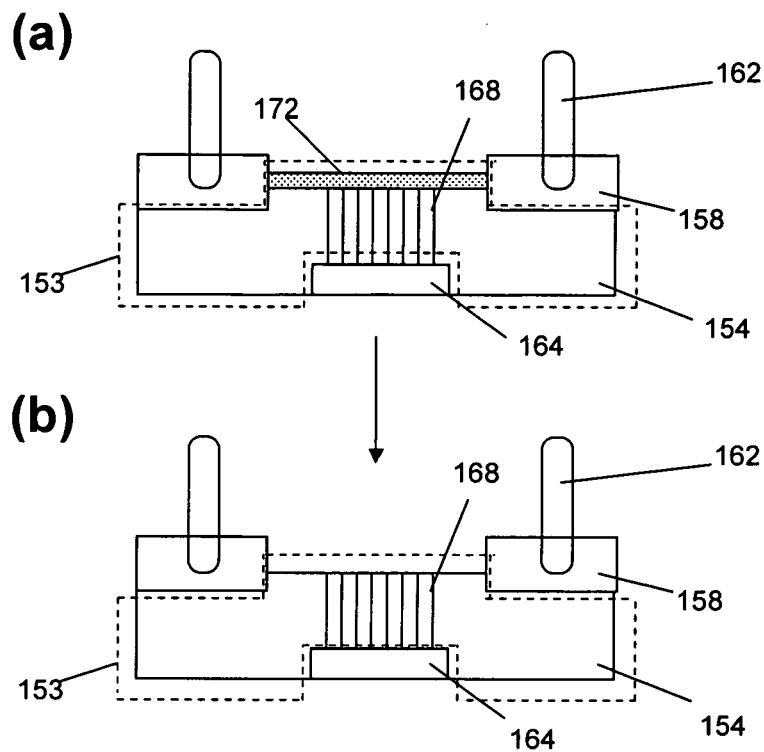
FIG. 22 is a schematic representation of additional steps to be performed with the method as depicted in FIG. 21.

Alternatively, the optoelectronic module may be further changed, as shown in FIG. 22. Using the structure obtained in FIG. 21(d), the uncured flattening layer 166 can be removed and replaced by another layer 172, such as another polymer layer, as shown in FIG. 22(a), which then becomes part of the encapsulation 153. This can be done if layer 166 is suitable for creating a flat interface on the encapsulant, but is not useful as a sealing layer because of its specific properties. A glass layer, for example, is suitable for creating a flat encapsulant layer, but is not suitable for making optical elements, such as microlenses, by means of excimer laser ablation.

This other layer 172 may have different properties than the first flattening layer 166, especially optical properties. The layer 172 can be cured by optical or thermal curing. If optical curing is used, the optical curing may be performed using UV radiation. The wavelength of the UV radiation typically used is different from the wavelength of UV radiation used for providing optical coupling structures 152, such as writing SWW in the optical encapsulate material 154. The latter is shown in FIG. 22(b).

This technique may be used in a module in which a first encapsulant flattened wave-guides are formed and in which a second encapsulant, on top of the first encapsulation optical elements are formed in a suitable material. In order to flatten the wave-guides in the first encapsulant, preferably a suitable flattening layer 166 may be temporarily applied. The flattening layer 166 is then removed and replaced by the second encapsulant. The second encapsulant preferably should be thin or contain optical elements to enhance the optical coupling.

Alternatively, the first flattening layer 166 applied during the flattening step may be cured (e.g., by performing a thermal curing step or an optical curing step such as a UV curing step) at a wavelength different from the wavelength used for providing optical coupling structures 152, such as writing SWW in the optical encapsulate material 154. The first flattening layer 166 may be removed, as the flattening layer 166 may limit the optical coupling. In selective areas, limited when compared to the total structure, curing may not be necessary, depending on the particular application. In other words, the encapsulate may be only partly cured. The rest of the encapsulate is still liquid but contained within the package due to sealing layer 166.

In FIG. 23 to FIG. 26, different steps of other examples are illustrated. The same steps 102, 104, 106 of the method 100 depicted in FIG. 19 may be performed. This is illustrated by way of example in FIGS. 23(a), (b), and (c), which are substantially the same as shown in FIGS. 21(a), (b), and (c).

Holes 180 may be provided in the encapsulation 153 (i.e., the flattening layer 166 and the optical encapsulate material 154). The holes 180 may be provided using ablation or other suitable technique as depicted in FIG. 23(d). Ablation is discussed in detail above.

The holes 180 are filled to form vertical wave-guides 168 as can be seen in FIG. 23(e). Alternatively, the flattening layer 166 may be first removed and holes 180 may be formed (e.g., by ablation) only in the optical encapsulate material as shown in FIG. 24(a). The holes 180, ablated in the optical encapsulate material 154, are refilled to form vertical wave-guides 168 as can be seen in FIG. 24(b).

Figure 25:
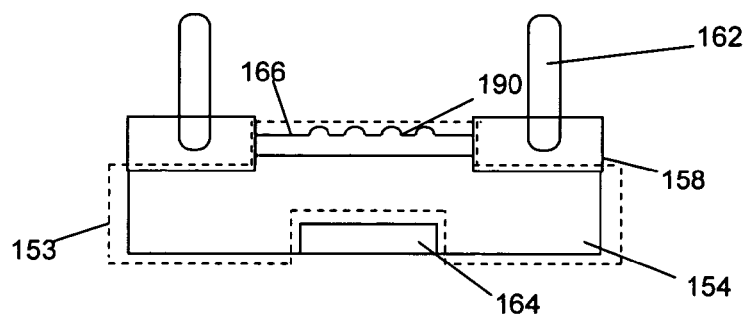

Alternatively, the structure depicted in FIG. 23(c) may be further processed by fabricating optical coupling structures 152 different from vertical wave-guides into the material, for example, by fabricating further optical coupling structures 152, such as optical elements 190 like microlenses, in the encapsulation 153, in the flattening layer 166 aligned to the alignment features 162. The latter are shown in FIG. 25. The optical elements 190 may be produced by laser ablation or other appropriate techniques.

In another alternative, after the flattening step 106, the obtained structure as shown in FIG. 23(c) may be changed further by removing the flattening layer 166 and by fabricating optical coupling structures 152 different from the wave-guides, such as optical elements 190 like microlenses directly in the optical encapsulate material 154, which is aligned to the alignment features 162 (e.g., alignment pins). The latter are shown in FIG. 26.

Figure 24:
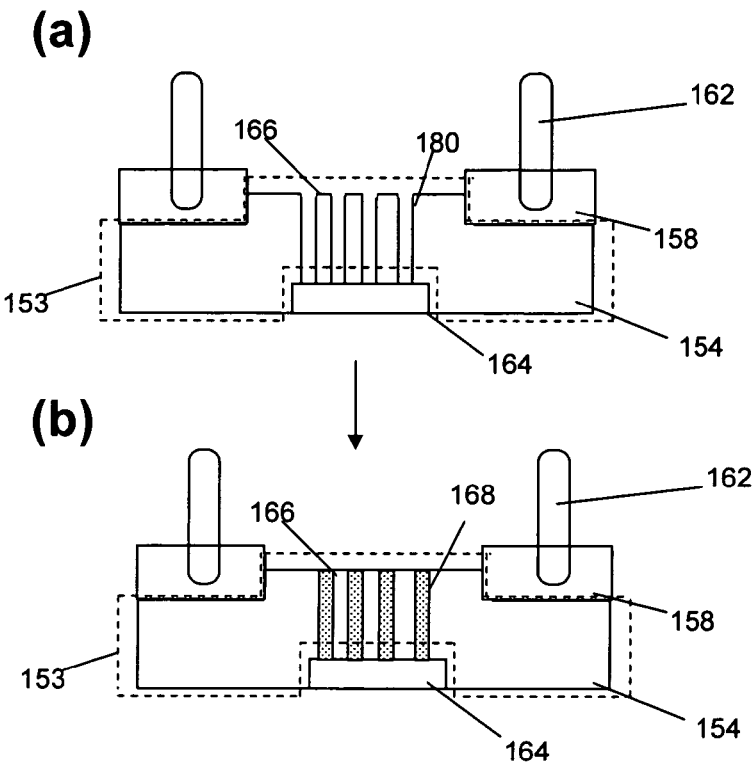
FIG. 24 to FIG. 26 are schematic representations of alternative steps to be applied in the method as depicted in FIG. 23.
Figure 26:
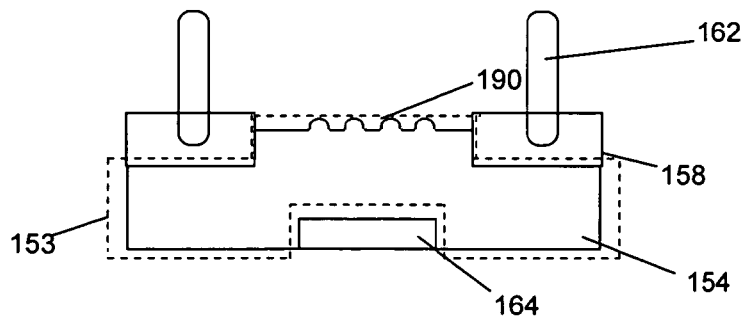

Removal of the flattening layer 166 as shown in FIG. 24 and FIG. 26 is typically performed when improved optical coupling from the external optical system to the optical coupling structures 152 in the underlying material are desired. The external optical system may be fibers and the underlying material may be a polymer, for example. The optical coupling structures 152 may be wave-guides 168 or optical elements 190. The optical elements 190 may be microlenses, such as laser ablated lenses.

Figure 23:
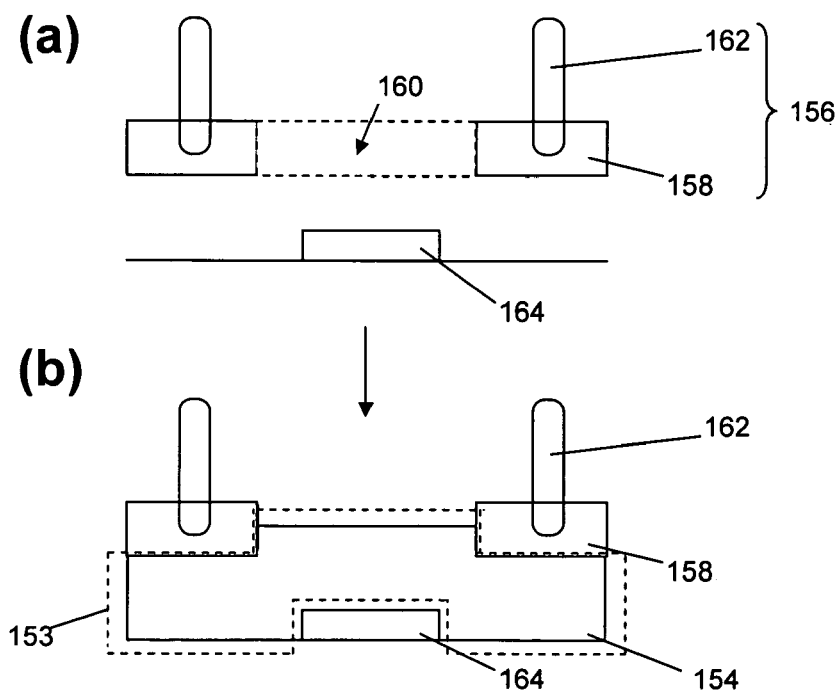
FIG. 23 is a schematic representation of an alternative method for providing an optical interface, according to an example.
Figure 23:
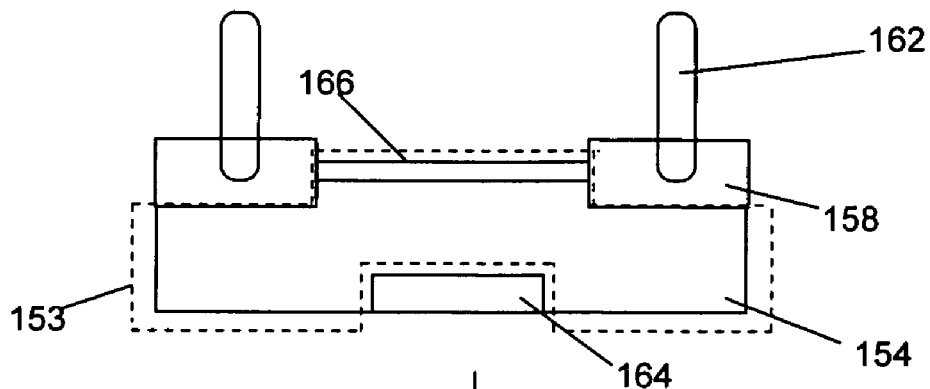
Figure 23:
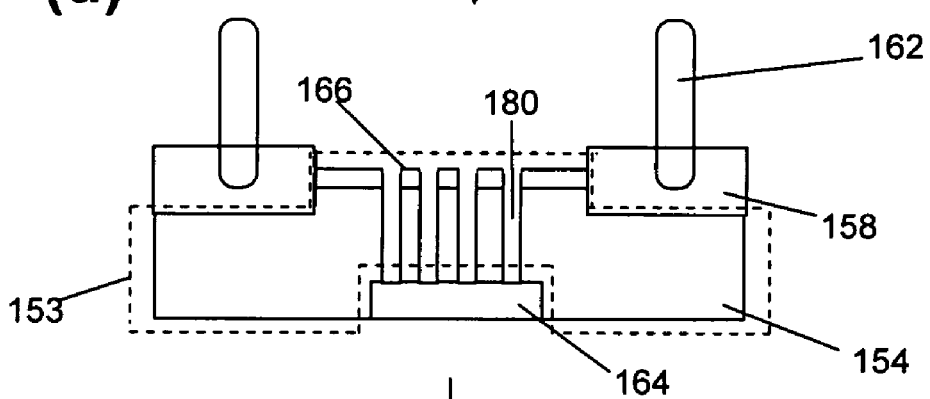
Figure 23:
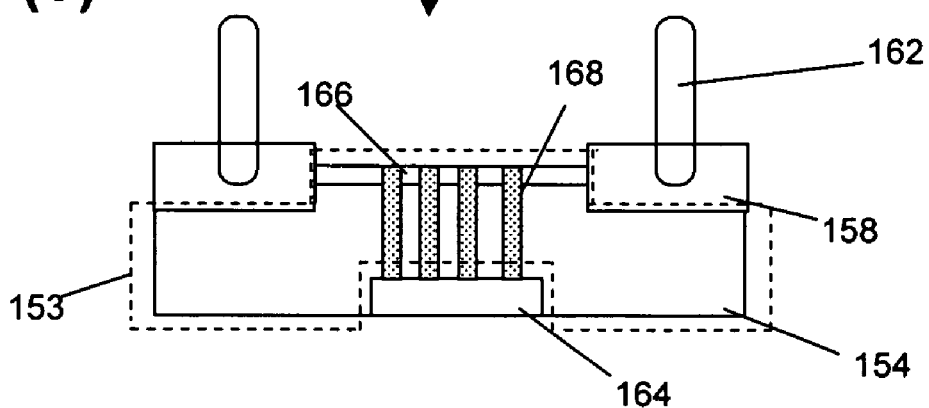

The flattening layer 166 can remain on the underlying optical encapsulate material 154. In this example, the flattening layer 166 and the optical encapsulate material 154 together forms the encapsulation 153. The flattening layer 166 may remain on the underlying optical encapsulate material 154 when it is advantageous to fabricate optical coupling elements 190 in this layer by means of laser ablation, for instance, as shown in FIG. 23 and FIG. 25.

Figure 27:
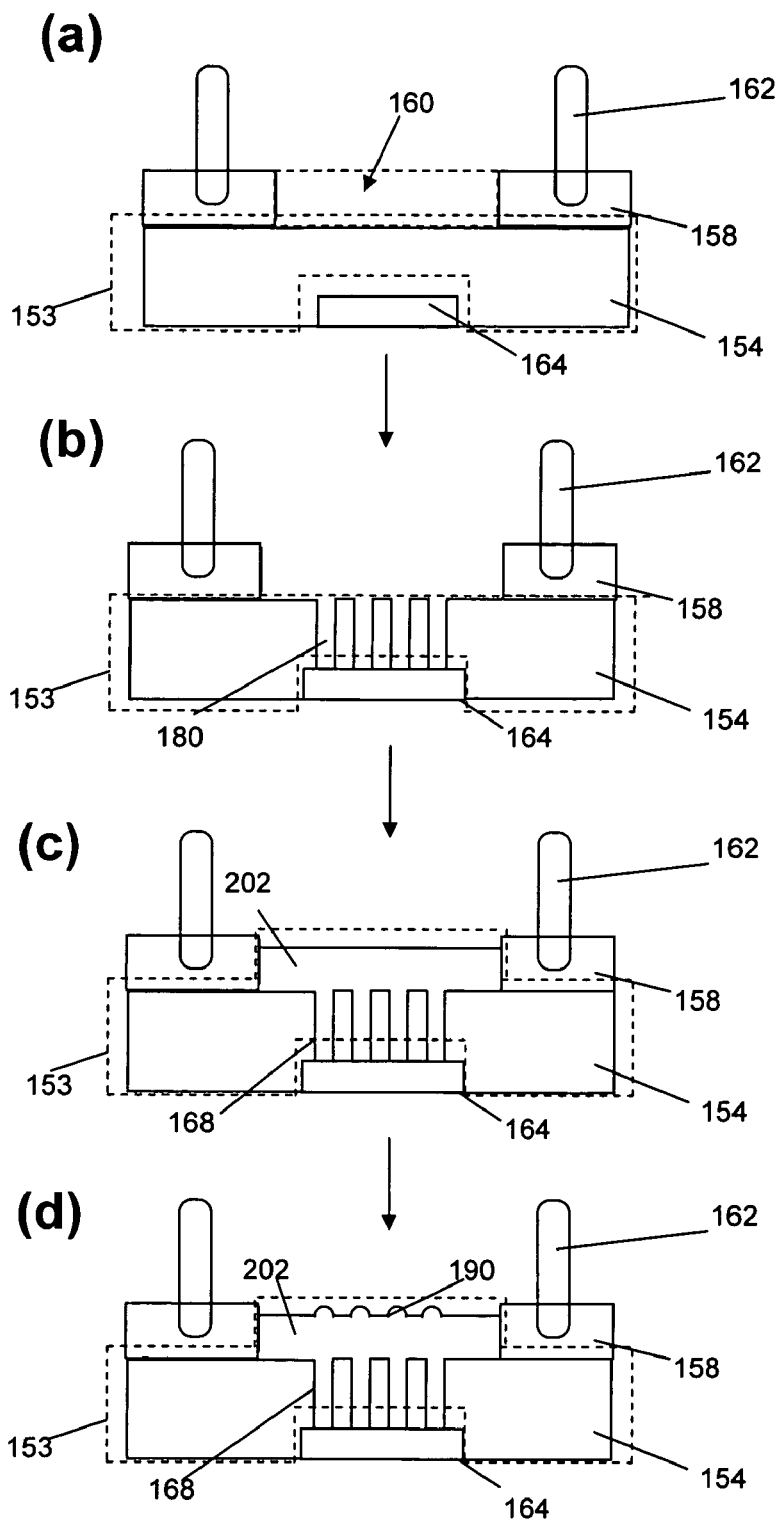
FIG. 27 is a schematic representation of a further alternative method for providing an optical interface, according to an example.

In FIG. 27, another example is described. In a first flat optical surface produced by steps 102, 104 and 106 of method 100, a structure is obtained as shown in FIG. 27(a). The flattening layer 166 as shown in FIG. 21(c) has been removed. The holes 180 are created using appropriate techniques, such as etching techniques or ablation. The resulting structure is shown in FIG. 27(b). The holes 180 may then be filled with a second encapsulate material 202. The second encapsulate material 202 is part of the encapsulation 153 and forms a new layer on top of the first flat surface, which is or can be made flat. Optical coupling elements, such as optical elements 190 may then be formed in the layer of second encapsulating material 202 and aligned above vertical wave-guides 168, which had been created when filling the holes with the second encapsulate material 202. The optical coupling elements may be formed in the layer of second encapsulating material 202 using ablation or other suitable technique.

Figure 28:
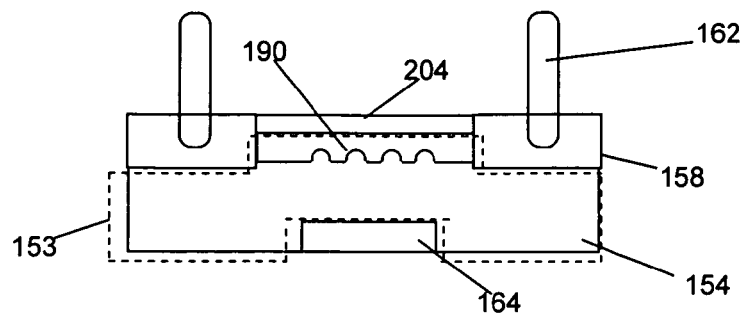
FIG. 28 is a schematic representation of a device with integrated micro-optical elements in an encapsulation covered with a covering plate, according to an example.

When optical elements 190 are provided on the external surface of the encapsulation 153, a cover plate 204 may be added above the optical elements 190, as shown in FIG. 28.

In the examples that include wave-guides 168, the wave-guides 168 may be ordered in an array configuration, as depicted in FIG. 21, FIG. 22, FIG. 23, FIG. 24, and FIG. 27. The array can form a regular rectangular lattice, a hexagonal lattice, or can have any other lattice configuration. The wave-guides 168 may also be randomly chosen, depending on the particular application.

In the examples in which the support means 158 (e.g., support plate) is placed in a device comprising an optoelectronic component 164, providing an encapsulation 153 by filling through the hole 160 bridges a gap between the optical interface to be obtained and the optoelectronic component 164 present. The optical coupling structures 152, such as the wave-guides 168, may then abut onto the optical ports of the optoelectronic component 164.

In the examples discussed above, the hole 160 in the support means 158 may further include an optical component. In other words, an optical component may be present in the hole 160 located in the support means 158.

Figure 29:
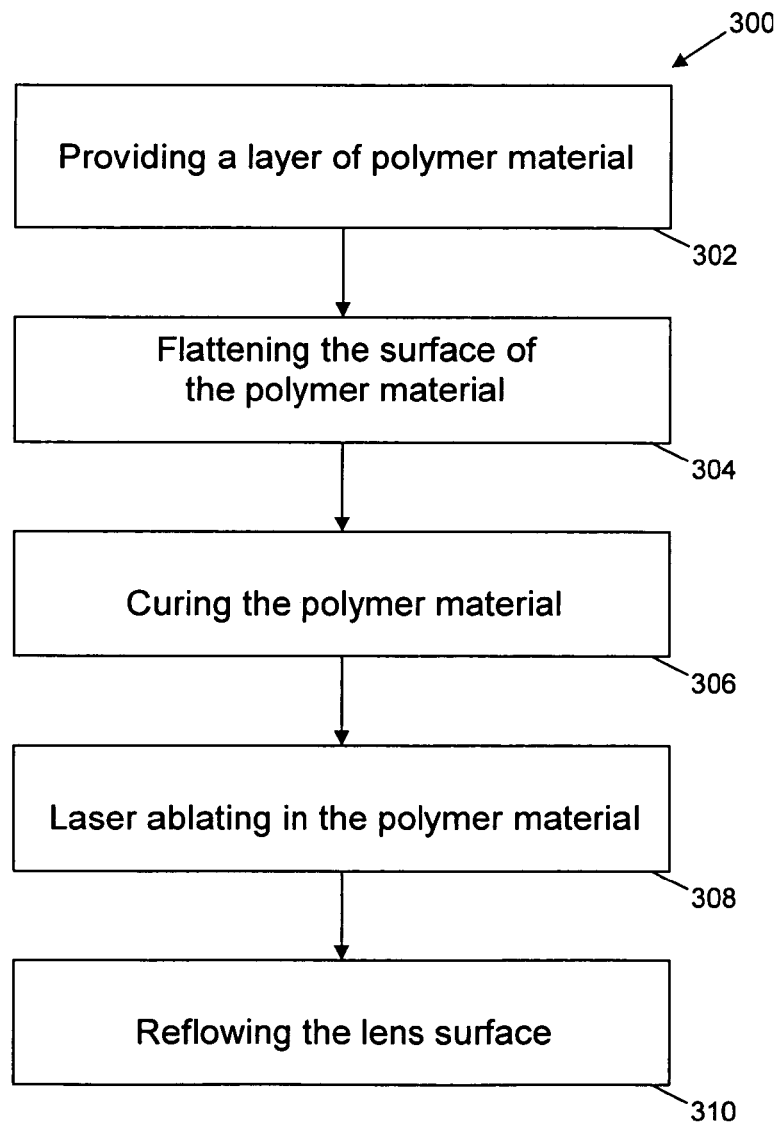
FIG. 29 is a flow chart of a method for producing micro lenses in a polymer material, according to an example.

Additionally, a method is provided for producing optical elements in a suitable material. The optical elements may be micro lenses or specific surface shapes, such as mirrors. The suitable material may be a material suitable for laser ablation. A method 300 for producing optical elements in suitable material is depicted in FIG. 29.

At block 302, a layer of suitable material is provided, such as a polymer material, glass or glass-like material, quartz, metals or certain ceramics. The polymer material is particularly suitable. The layer of suitable material may be provided in a hole in a support means, which may be part of a packaging of an optoelectronic module.

At block 304, the surface of the suitable material is flattened. Flattening the suitable material is optional, depending on the quality and flatness of the suitable material provided. Flattening techniques are well known and an example technique is described above in more detail.

At block 306, the suitable material suitable is cured. Curing may be optional, depending on the suitable material provided. Curing is typically performed for polymer materials.

At block 308, laser ablating in the suitable material is performed such that optical elements (e.g., micro lenses or mirrors) are formed at controlled locations in the surface by using the alignment feature of the external alignment structure.

At block 310, if the surface quality of the optical element surfaces is insufficient and/or needs to be improved, reflowing of the optical element surfaces is performed. Reflowing of the optical element may not be necessary if surface quality is sufficient.

Providing a suitable material, such as a polymer layer, a glass or glass-like material, quarts, metals or a number of ceramics, may include providing any material suitable for controlled material removal by means of pulsed laser ablation. Polymer material is especially useful for laser ablation applications. In case of excimer laser ablation, polycarbonate has a superior surface finish after ablation. Polyimide, polystyrene, benzo-cyclo-buthene (BCB), Cyclic Olefin Copolymers, poly methyl methacrylate, and other acrylates are other examples of polymers that are suitable for ablation of optical elements, such as lenses.

Some examples of suitable excimer lasers for performing the ablation may be fluorine lasers having a dominant wavelength of 157 nm, argonfluoride lasers emitting at 193 nm, kryptonfluoride lasers emitting at 248 nm, a quadrupled YAG laser emitting at 266 nm, or any other laser emitting laser pulses in the UV wavelength. At these UV wavelengths, polymers usually show a high absorption, which is desirable for ablation.

Certain optical elements, such as micro lenses, may be ablated into the material suitable for ablation by using a contour scanning technique. In the following, a more detailed description of laser ablation according to a contour scanning technique is given. This technique is a rapid prototyping method for refractive microoptics with arbitrary surface profile. Optical elements, such as spherical lenses with a broad range of f-numbers have been fabricated and wave front aberrations well below λ/10 are reported for slow lenses.

It is experimentally verified that the best results in terms of aberrations are obtained for low etch rates, i.e. low laser fluences. These aberrations have been showed to be, at the same laser fluence, independent of the pulse rate and contour velocity. The contour writing sequence is of little importance for high f-numbers. For fast lenses, ablating the lens from the rim towards the center yields the lowest lens aberrations. The fabrication method shows some obvious benefits compared to other fabrication techniques, such as the direct-write and contactless nature of the ablation process; the possibility to define microstructures and microoptics on a top surface of a heterogeneous optoelectronic module in a late phase of the assembly process; the flexibility in terms of surface shapes, diameter, and focal length; the simplicity of the set-up; and the possibility to fabricate arrays of identical lenses at the same time. These advantages make scanning contour ablation an attractive microoptics fabrication technique at prototyping level and for modest volume production. More details of the fabrication technique can be found in the above part of the description, as well as in "Direct Writing of Micro Lenses in Polycarbonate with Excimer Laser Ablation" by K. Naessens in Applied Optics 42 (31) (2003) p6349-6359.

In one example, a circular laser beam is used for making optical elements with a spherical footprint. This beam makes circular contour movements during firing of the laser, resulting in a sequence of holes, each having the lateral dimensions of the beam. Optical elements, such as lenses, even with non-circular footprints, can also be realized with other beam and/or contour shapes. For example, elliptical footprints can be realized with an elliptical beam spot and scanning along elliptical contours.

The beam fluence for ablation of optical elements typically involves 50-500 mJ/cm$^2$ in order to obtain a good lens surface, but is not be limited to this range. Optical elements are preferably put in a regular rectangular, hexagonal, or any other lattice structure, depending on the application. The laser ablation technique is capable of making full arrays in one go using multiple beams and in essentially the same time as for a single optical element with a single beam. The multiple beams can be realized by using a beam mask consisting of an array of holes.

Optionally, at block 310, the optical element surface area may be smoothed to optical quality by surface reflow. The latter depends typically on the quality of the optical element surface area after ablation and on the requirements for the optical element surface area. The ablated optical element area might show some irregularities and surface roughness due to overlapping of ablated holes, which is the result of the discrete ablation process. Reflow can be obtained by locally or entirely heating of the layer. In a specific example, the entire optical element surface or optical element array surface can be exposed to additional laser pulses. Each pulse removes a thin layer of material while heating a thin layer below the ablated crater, thus, gradually smoothing out the surface. Depending on the fluence, a train of 100 pulses may be sufficient to obtain optical quality, driving the optical elements some 5 microns deeper.

A method for controlled positioning and bonding of an external alignment structure on a module and devices fabricated accordingly is also described. This method can be applied to mount an external alignment structure on a supporting structure surrounding an optoelectronic component. The module includes a supporting structure having a supporting surface area and module alignment reference features. The external alignment structure has a support means, such as a support plate, and alignment reference features (i.e., features for aligning the support means).

Figure 30:
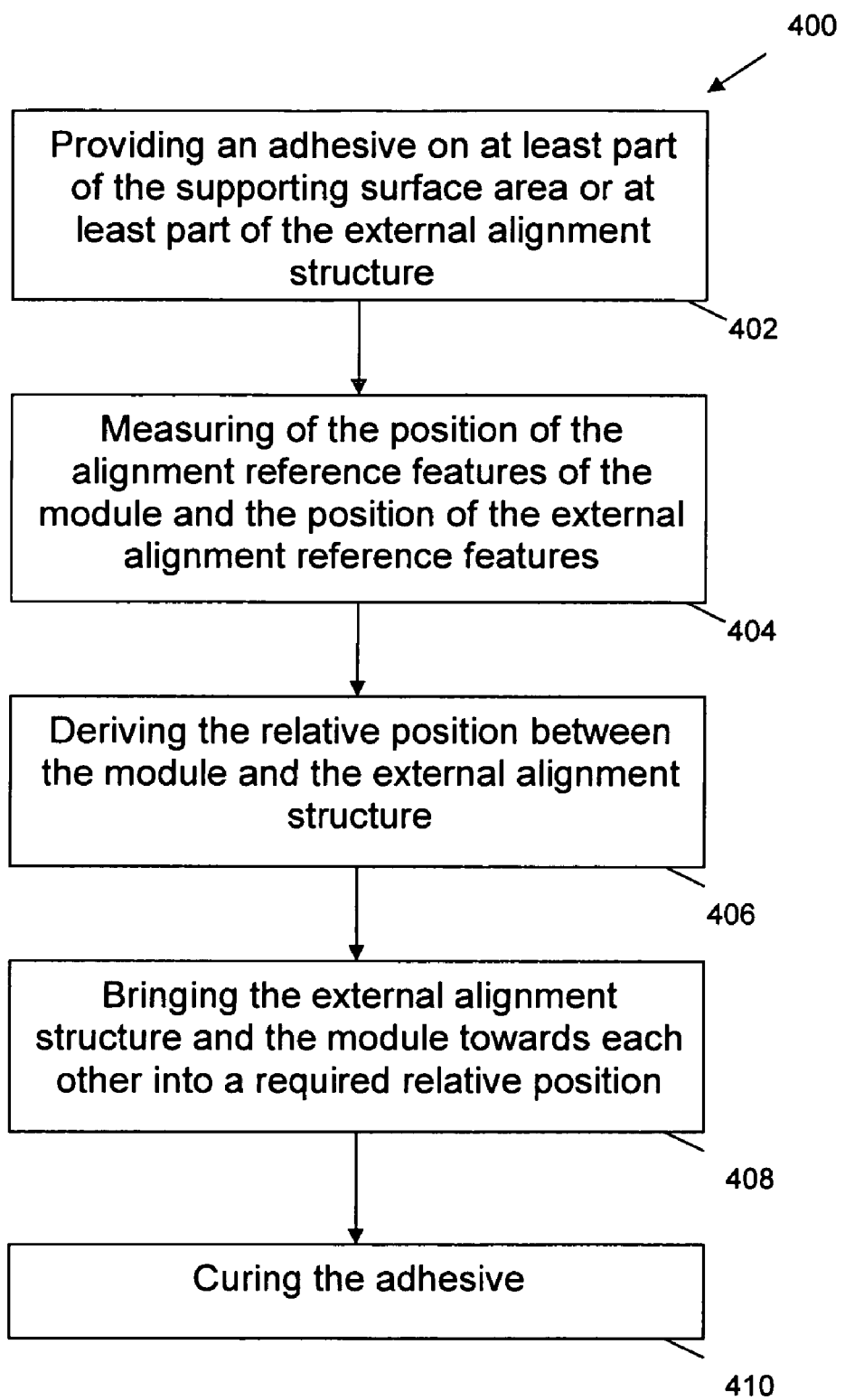
FIG. 30 is a flow chart of a method for controlled positioning and bonding of an external alignment structure on a module, according to an example.

The method 400 for controlled positioning and bonding is described with reference to FIG. 30. At block 402, an adhesive is provided on at least part of the supporting surface area or on at least part of the support plate. The adhesive may be UV curable or thermal curable acrylates, such as Norland Adhesives (types 61, 65, 72, 83H) Delo-Photobond 4302, Dymax OP-65-LS, Ablestik (types A4083, A4031 and A4039), Ormocer, UV or thermal curable epoxies and silicones, two-component adhesives, etc.

At block 404, the position of the alignment reference features of the module and the alignment reference features of the external alignment structure are determined. The sequence for determining both positions may be altered and determining the positions may even be performed in parallel. Both positions may be determined in absolute values. Alternatively, it is possible to determine a first position in absolute values and a second position relative to the first position.

From the determined positions, the relative position between the module and the device is derived at block 406. At block 408, the device and the module are brought towards each other to a required (e.g., based on optical coupling characteristics or other technical motivations) relative position (x, y, z) based on the relative positions obtained at block 406. At block 410, when the device and the module are in the required relative position, the adhesive is cured.

The presence of the adhesive allows flexibility in a particular direction, here in the vertical or z-direction. The vertical or z-distance between the external alignment structure and the supporting structure can still be varied before the adhesive is cured. As a result, object and image distances of optical systems can still be tuned. This can easily be done for a vertical distance up to 500 μm, as for instance 100 μm, 200 μm, 300 μm, or 400 μm.

Preferably, the standard deviation on the thickness of the applied adhesive layer is smaller than 50 μm. The thickness of adhesive layer after the dispensing typically is in the order of 250 μm to 500 μm, depending on the expected gap between spacer plate 158 and interposer 604/614. After alignment and curing, thickness is determined by the gap between the spacer plate and the interposer.

This alignment procedure differs from traditional vision-based alignment techniques in the sense that in traditional systems, both objects are captured instantaneously by the same vision system. For example, the alignment features of both objects need to be on the same video screen, so that the operator or the software can align both objects. This is not needed in the examples provided as the measurement of the position of both objects is decoupled. The measurement of the position itself can be based on a vision system.

In other words, in the examples provided, the coordinates (x, y, z) of alignment features on both the reference component and the second component are determined. Next, the second component is moved towards the desired location, which requires a relative translation entirely determined by the measured coordinates. The two components do not need to be aligned through direct aligning of features on both components (i.e., by aligning both components). Aligning both components is difficult because the alignment features of both components usually are not in the same focus plane of the camera. Accurate alignment in a third dimension (e.g., perpendicular to the image plane of the camera) can be performed, thus improving the accuracy.

The method 400 does not rely on the dimensional accuracy of the second component. In other words, accurate alignment can be performed substantially independent of the dimensional accuracy of the second component. The method 400 reduces the economical and physical effort needed for obtaining an acceptable dimensional accuracy of these components for optical interconnect applications. The method 400 is based on the use of a single camera and a coordinate measurement machine, which allows alignment of objects in 3D with almost no restrictions on the shape and position of the alignment features on the objects. The alignment features do not have to be close together so that they fit in a field of view of a vision system, or the distance between the features does not have to be sufficiently large so that two vision systems can be used, each of them looking to one feature. Furthermore, the objects do not have to be transparent. These objects can be opaque.

The alignment procedure is based on a combination of a co-ordinate measurement machine (CMM), a module mounting chuck, an external alignment structure grip, and a controlled alignment stage (CAS). The module mounting chuck is fixed to the CMM, having fixed co-ordinates with respect to the co-ordinate measurement machine. The external alignment structure grip is attached to the CAS. The CAS is coupled to the CMM, and the movements of the CAS are calibrated by the CMM. The CAS may be mounted on the CMM. This set-up allows measuring the co-ordinates of the module, to measure the co-ordinates of the external alignment structure, and to move the external alignment structure to the desired position relative to the module. Then the position of the external alignment structure is fixed using a standard method, for example by using a UV curable adhesive.

In certain examples, the module includes an optical component, the external alignment structure includes an optical interface comprising optical coupling structures, and the required relative position is such that the optical coupling structures are aligned with the optical component.

Figure 31:
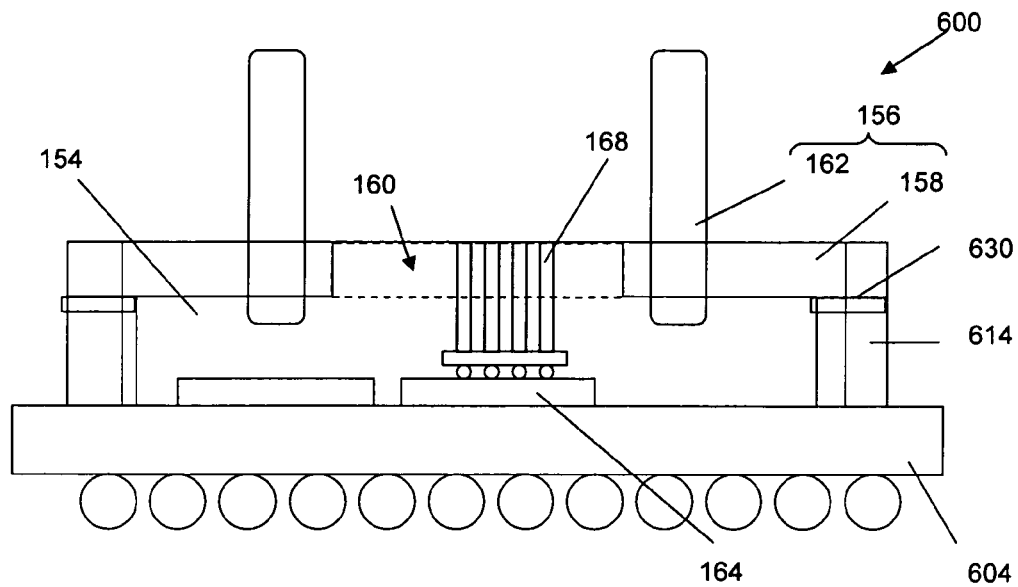
FIG. 31 shows a packaged active optoelectronic module, according to an example.
Figure 32:
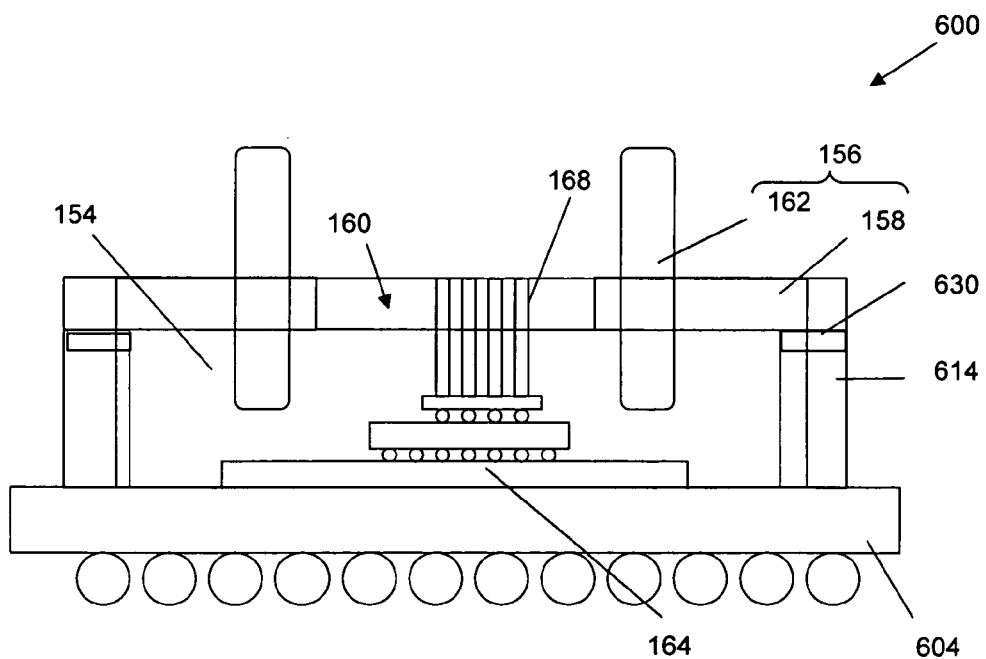
FIG. 32 shows a packaged active optoelectronic module, according to another example.
Figure 33:
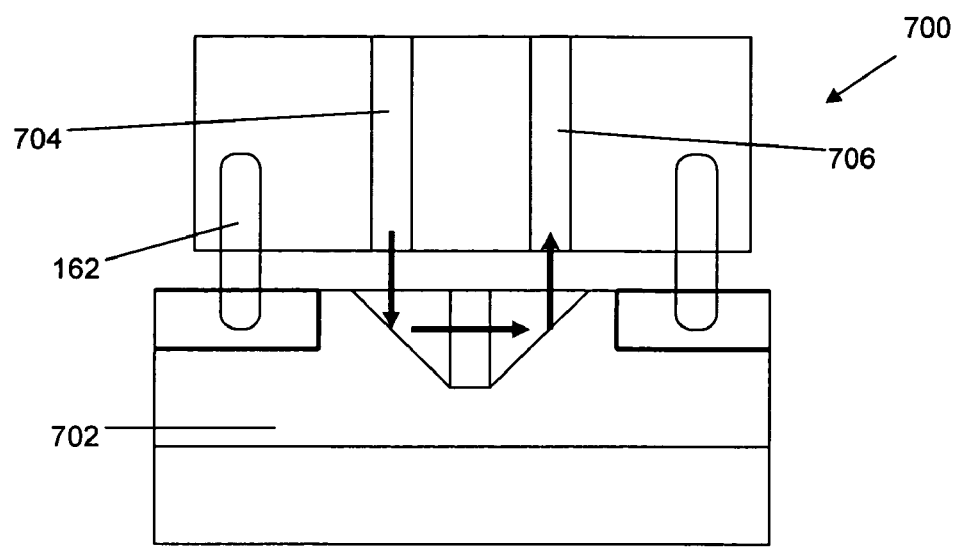
FIG. 33 shows a packaged passive optoelectronic module, according to an example.
Figure 34:
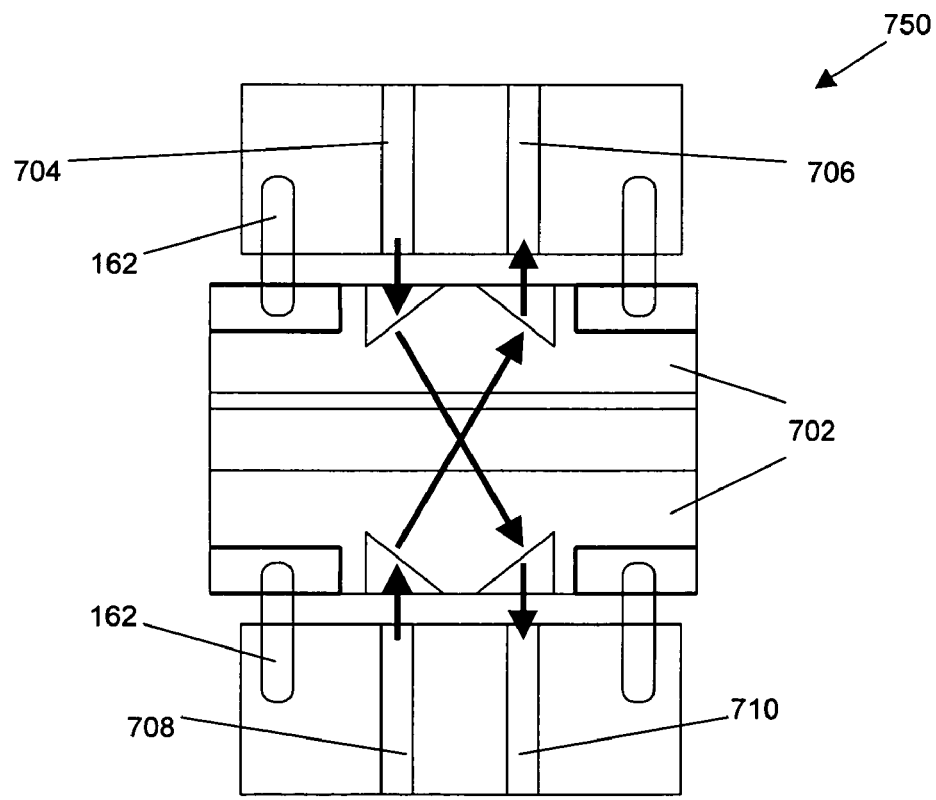
FIG. 34 shows a packaged passive optoelectronic module, according to another example.

The optical modules 600, 700, 750 may comprise optoelectronic components, as shown in FIG. 31 and FIG. 32, but they also may have no active optoelectronic components, as shown in FIG. 33 and FIG. 34. In other words, there is no need for active optoelectronic components.

The optical modules 600 as shown in FIG. 31 and FIG. 32, typically include one or more optoelectronic components 164, an interposer 604, providing an interface between different components, such as chips for driving the optoelectronic components 164, the at least one optoelectronic component 164, a printed circuit board (not shown), a surrounding supporting structure 614, which is surrounding the at least one optoelectronic component 164 in-plane. The optical module 600 also includes an external alignment structure 156, based on a support means 158, which may be a support plate. The support means 158 includes at least one hole 160 and external alignment features 162, such as alignment pins. The optical module 600 also includes a layer of cured adhesive 630 between the support means 158 and the surrounding supporting structure 614.

The interposer 604, the surrounding supporting structure 614, the cured adhesive 630, and the external alignment structure 156 together form a cavity. The cavity may be a closed cavity, which is closed except for the at least one hole 160 in the support means 158 of the external alignment structure 156. The cavity may also include the at least one optoelectronic component 164.

Inside the cavity, the encapsulation 153 is provided which comprises at least the optical encapsulate material 154, which extends from at least one of the at least one optoelectronic component 164 into the hole 160 in the support means 158. The encapsulation 153 has either a flat external surface in the hole 160 or comprises optical coupling elements, such as micro lenses or mirrors, at its external surface.

In order to obtain a flat external surface for the encapsulation 153, the optical encapsulate material 154 may be flattened, as described above. During the flattening, a covering layer, which typically is a polymer layer, may be applied to the optical encapsulate material 154. The covering layer becomes part of the encapsulation 153. Other layers, typically polymer layers, also may be applied to the optical encapsulate material 154, also becoming part of the encapsulation 153. Thus, the encapsulation 153 includes not only the optical encapsulate material 154, but also possible additional layers.

The interposer 604, surrounding the supporting structure 614, and the external alignment structure 156 can each be different components or they can be integrated into fewer components, such as a single component, together having the relevant corresponding functionality. The angle between the external alignment structure 156 and the underlying supporting structure can be controlled and can be different from 0°, which can be interesting for certain types of external optical systems, for instance, in the field of sensor packaging.

No module-specific high-precision mechanical parts, which typically are expensive, are employed to fabricate the module. Another advantage is that the external surface of the external alignment structure can be placed parallel with a high degree of precision. The precision depends on the quality of the co-ordinate-measuring machine and the size of the object.

Preferably, the optical encapsulate material 154 is a polymer with high glass temperature that is compatible with electronic manufacturing techniques, such as solder reflow. The polymer optical encapsulate material 154 can be a thermoplast or thermoset. The polymer optical encapsulate material 154 can be UV curable, resulting in lower stress during and after curing, or thermally curable, suitable for thicker layers. The polymer should be optically clear, and suitable for fabrication of wave-guides in the encapsulation 153. The polymer optical encapsulate material 154 can be a UV curable polymer, such as acrylates, allowing for room-temperature fabrication without diminishing the properties of the underlying module.

In certain examples, the encapsulation 153 (i.e., the optical encapsulate material and/or polymer layers provided on top of the encapsulate material during flattening or for other purposes) includes optical coupling structures, such as wave-guides 168, micro lenses 190, or mirrors. The optical coupling structures can be positioned perpendicularly to the surface of the interposer 604 (i.e., their optical axis can be perpendicular to the interposer 604).

In certain embodiments, the optical wave-guides 168 are self written wave guides. The wave-guides 168 may have an inclination (not shown in FIG. 31 and FIG. 32) with respect to the surface of the interposer 604. The optical wave-guides 168 may be coupled to the optical ports of optical components. In other examples, the optical coupling structures are formed by a flat (with respect to topology, not with respect to orientation) surface of the encapsulation 153.

In FIG. 33 and FIG. 34, passive optical devices 700, 750 are shown, which can be made using the techniques described above. In these passive optical devices 700, 750, at least one external alignment structure, for example an alignment pin, is mounted on a passive structure. Optical coupling structures are provided to define an optical function for the passive optical components 700, 750. Such an optical function may provide a coupling between different optical fiber arrays, providing a reflection portion at an end of an optical fiber array.

In a first example, as shown in FIG. 33, a passive optical component 700 is disclosed. The optical coupling structures are provided in the form of flat surfaces or other topologies, and may be made by laser ablation into a material 702 corresponding to the encapsulation 153. The optical coupling structure is not necessarily encapsulating an optoelectronic component. For example, the optical coupling structure may encapsulate mirrors that can guide and/or reflect incoming light from a first fiber 704 in certain directions as for instance back into another outgoing fiber 706. By way of example, a possible light pathway for the light is illustrated by the arrows in FIG. 33.

In a second example, as shown in FIG. 33, a passive optical component 750 is shown in which two external alignment structures 162 are mounted on a passive structure. The optical coupling structures are defined in between the external reference structures, to define an optical function from one side to the other side. In this way, improved coupling between fiber arrays with different fiber properties can be obtained. In this embodiment, laser ablated structures, as for instance mirrors, to guide the incoming light into outgoing fibers, are introduced. For instance a left-right switch or any other permutation of signal-carrying fibers can be achieved for two or more fibers.

It is to be noted that the two devices shown in FIG. 33 and FIG. 34 are only exemplary, and that the invention is not limited to these devices, but also refers to other types of passive optical structures (i.e., optical structures without optoelectronic components having features). Typically, the passive optical structures are adjusted to be used with optical connectors, such as MT-RJ connectors.

Other arrangements for accomplishing the objectives of the methods for providing an optical interface in the packaging of optical modules and the devices obtained using these methods and embodying the invention will be obvious for those skilled in the art. It is to be understood that although preferred embodiments, specific constructions and configurations, as well as materials, have been discussed herein for devices according to the present invention, various changes or modifications in form and detail may be made without departing from the scope and spirit of this invention.

We claim:

1. A method for forming an optical module having an optoelectronic component and an optical interface with an optical coupling structure, comprising in combination:
   providing an external alignment structure, comprising a support means with at least one hole and at least one alignment feature;
   providing an encapsulation comprising optical encapsulate material in the at least one hole; and
   forming at least one optical coupling structure in the encapsulation, wherein the at least one optical coupling structure is formed at a well-defined position relative to the at least one alignment feature of the external alignment structure; and
   coupling at least one optoelectronic component to the at least one optical coupling structure, wherein the at least one optoelectronic component is separated from an edge and outside of the at least one hole.

2. A method according to claim 1, wherein forming at least one optical coupling structure in the encapsulation comprises direct writing at least one optical coupling structure into the encapsulation.

3. A method according to claim 1, further comprising, prior to forming at least one optical coupling structure in the encapsulation, flattening an external surface of the optical encapsulate material, thereby creating a substantially flat external surface of the encapsulation.

4. A method according to claim 3, wherein the external surface of the encapsulation is aligned with an external surface of the support means.

5. A method according to claim 3, wherein the external surface of the encapsulation is outside a plane determined by the external surface of the support means.

6. A method according to claim 3, wherein the at least one optical coupling structure comprises micro lenses formed on the external surface of the encapsulation.

7. A method according to claim 3, wherein flattening the external surface of the optical encapsulate material, comprises:
   providing a flattening layer on the external surface of the optical encapsulate material; and
   curing of the optical encapsulate material underneath the flattening layer.

8. A method according to claim 7, wherein the flattening comprises at least one radiation curing step.

9. A method according to claim 8, wherein a mask is used to pattern the at least one radiation curing step.

10. A method according to claim 3, wherein flattening the external surface of the optical encapsulate material, comprises:
   providing a flattening layer on a stamp;
   pressing the flattening layer on the external surface of the optical encapsulate material by means of the stamp;
   curing the optical encapsulate material underneath the flattening layer; and
   removing the stamp.

11. A method according to claim 10, wherein the step of removing the stamp also removes the flattening layer.

12. A method according to claim 10, wherein the step of removing the stamp leaves the flattening layer attached to the cured optical encapsulate material, as part of the encapsulation.

13. A method according to claim 10, wherein the stamp is such that it forms a mask.

14. A method according to claim 1, wherein the at least one optical coupling structure includes wave-guides formed through the encapsulation.

15. A method according to claim 14, wherein the wave-guides are ordered into an array configuration.

16. A method according to claim 1, wherein the hole comprises an optical element.

17. A method according to claim 1, wherein the support means comprises alignment features on two sides of the hole.

18. A method according to claim 1, wherein providing an external alignment structure comprises positioning an external alignment feature on a device support means of a device comprising the at least one optoelectronic component, and wherein providing the encapsulation bridges a gap between the optical interface and the at least one optoelectronic component on the device.

19. A method according to claim 1, wherein forming at least one optical coupling structure comprises ablating the at least one optical coupling structure in the encapsulation.

* * * * *